United States Patent
Kim et al.

(10) Patent No.: US 12,219,579 B2
(45) Date of Patent: Feb. 4, 2025

(54) METHOD AND DEVICE FOR TRANSMITTING/RECEIVING DOWNLINK CONTROL INFORMATION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 17/795,852

(22) PCT Filed: Jan. 27, 2021

(86) PCT No.: PCT/KR2021/001057
§ 371 (c)(1),
(2) Date: Jul. 27, 2022

(87) PCT Pub. No.: WO2021/157938
PCT Pub. Date: Aug. 12, 2021

(65) Prior Publication Data
US 2023/0112271 A1   Apr. 13, 2023

(30) Foreign Application Priority Data

Feb. 7, 2020   (KR) .................... 10-2020-0015283
Jul. 15, 2020  (KR) .................... 10-2020-0087820
Aug. 24, 2020  (KR) .................... 10-2020-0106259

(51) Int. Cl.
*H04W 72/232*   (2023.01)
*H04L 1/08*     (2006.01)
(Continued)

(52) U.S. Cl.
CPC ............ *H04W 72/232* (2023.01); *H04L 1/08* (2013.01); *H04L 5/0053* (2013.01); *H04L 5/0091* (2013.01); *H04W 72/12* (2013.01)

(58) Field of Classification Search
CPC ... H04W 72/232; H04W 72/12; H04W 72/53; H04L 1/08; H04L 5/0053; H04L 5/0091;
(Continued)

(56) References Cited

U.S. PATENT DOCUMENTS 10,524,244 B2   12/2019  Tsai et al.
2016/0242203 A1  8/2016  You et al.
(Continued)

FOREIGN PATENT DOCUMENTS

| EP | 3267751 | 1/2018 | |
|---|---|---|---|
| KR | 20190017675 | 2/2019 | |
| WO | WO-2021022736 A1 * | 2/2021 | ............... H04L 1/08 |

OTHER PUBLICATIONS

PCT International Application No. PCT/KR2021/001057, International Search Report dated Apr. 30, 2021, 9 pages.

*Primary Examiner* — Vinncelas Louis
(74) *Attorney, Agent, or Firm* — LEE, HONG, DEGERMAN, KANG & WAIMEY

(57) ABSTRACT

Disclosed are a method and a device for transmitting or receiving downlink control information in a wireless communication system. A method for receiving downlink control information (DCI) according to an embodiment of the present disclosure any comprise the steps of: repeatedly receiving the DCI via a plurality of physical downlink control channel (PDCCH) candidates; and transmitting or receiving data scheduled via the DCI. The DCI may be transmitted via a first physical downlink control channel (PDCCH) candidate within a first search space set and a second PDCCH candidate within a second search space set, the first search space set and the second search space set may (Continued)

be related to different transmission configuration indication (TCI) states, and a window that is a duration in which the first PDCCH candidate and the second PDCCH candidate are transmitted may be preconfigured in a time domain.

17 Claims, 20 Drawing Sheets

(51) Int. Cl.
*H04L 5/00* (2006.01)
*H04W 72/12* (2023.01)

(58) Field of Classification Search
CPC ....... H04L 5/0023; H04L 25/02; Y02D 30/70; H04B 7/024
See application file for complete search history.

(56) References Cited

U.S. PATENT DOCUMENTS

| | | |
|---|---|---|
| 2020/0029310 A1 | 1/2020 | Lee et al. |
| 2021/0195600 A1* | 6/2021 | Khoshnevisan ...... H04W 72/53 |

* cited by examiner

METHOD AND DEVICE FOR TRANSMITTING/RECEIVING DOWNLINK CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2021/001057, filed on Jan. 27, 2021, which claims the benefit of earlier filing date and right of priority to Korean Application Nos. 10-2020-0015283, filed on Feb. 7, 2020, 10-2020-0087820, filed on Jul. 15, 2020, and 10-2020-0106259, filed on Aug. 24, 2020, the contents of which are all incorporated by reference herein in their entireties.

TECHNICAL FIELD

The present disclosure relates to a wireless communication system, and in more detail, relates to a method and an apparatus of transmitting and receiving downlink control information in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for repeatedly transmitting and receiving downlink control information (or PDCCH) between a terminal and multiple transmission reception points (TRPs).

In addition, an additional technical object of the present disclosure is to provide a method and an apparatus for configuring a control resource set (CORESET) and a search space set for each PDCCH candidate in order to repeatedly transmit and receive downlink control information (or PDCCH) between a terminal and multiple TRPs.

The technical objects to be achieved by the present disclosure are not limited to the above-described technical objects, and other technical objects which are not described herein will be clearly understood by those skilled in the pertinent art from the following description.

Technical Solution

A method of receiving downlink control information (DCI) in a wireless communication system according to an aspect of the present disclosure may include repeatedly receiving the DCI through a plurality of physical downlink control channel (PDCCH) candidates; and transmitting and receiving data scheduled by the DCI. The DCI may be transmitted through a first physical downlink control channel (PDCCH) candidate in a first search space set and a second PDCCH candidate in a second search space set, the first search space set and the second search space set may be related to different transmission configuration indication (TCI) states, a window that may be a duration in which the first PDCCH candidate and the second PDCCH candidate are transmitted in a time domain is predetermined.

A terminal for receiving downlink control information (DCI) in a wireless communication system according to an additional aspect of the present disclosure may include at least one transceiver for transmitting and receiving a radio signal; and at least one processor for controlling the at least one transceiver. The processor may be configured to: repeatedly receive the DCI through a plurality of physical downlink control channel (PDCCH) candidates; and transmit and receive data scheduled by the DCI. The DCI may be transmitted through a first physical downlink control channel (PDCCH) candidate in a first search space set and a second PDCCH candidate in a second search space set, the first search space set and the second search space set may be related to different transmission configuration indication (TCI) states, a window that may be a duration in which the first PDCCH candidate and the second PDCCH candidate are transmitted in a time domain is predetermined.

A computer-readable medium for executing a method of receiving downlink control information (DCI) in a wireless communication system in a wireless communication system according to an additional aspect of the present disclosure may control to: repeatedly receive the DCI through a plurality of physical downlink control channel (PDCCH) candidates; and transmit and receive data scheduled by the DCI. The DCI may be transmitted through a first physical downlink control channel (PDCCH) candidate in a first search space set and a second PDCCH candidate in a second search space set, the first search space set and the second search space set may be related to different transmission configuration indication (TCI) states, a window that may be a duration in which the first PDCCH candidate and the second PDCCH candidate are transmitted in a time domain is predetermined.

Preferably, a number of repeated transmission of the DCI may be preconfigured or determined based on a number of TCI states configured for repeated transmission of the DCI.

Preferably, the window may start at every PDCCH transmission occasion of a specific search space set among the first search space set and the second search space set.

Preferably, when a plurality of PDCCH transmission occasions of the specific search space set are included in the window, the window may start at every PDCCH transmission occasion of the specific search space set after the window.

Preferably, the specific search space may be a search space set having the lowest identifier among the first search space set and the second search space set.

Preferably, N windows (N is a natural number) may be configured for each period of a specific search space set among the first search space set and the second search space set.

Preferably, the TCI states may be sequentially and circularly mapped to each PDCCH transmission occasion of the first search space set and the second search space set within the window.

Preferably, the TCI states may be sequentially and circularly mapped to each of contiguous PDCCH transmission occasions of the first search space set and the second search space set within the window.

Preferably, a step of receiving configuration information from a base station may be further included, the configuration information may include information for informing that the first search space set and the second search space set are used for repeated transmission through the plurality of PDCCH candidates of the DCI.

Preferably, the first search space set and the second search space set may be related to a single control resource set (CORESET), a plurality of TCI states may be configured in the single CORESET, and the first search space set and the second search space set are related to different TCI states among the plurality of TCI states.

Preferably, the single CORESET may be a CORESET used to transmit system information.

Preferably, the first search space set and the second search space set may be related to a first control resource set (CORESET) and a second CORESET, respectively.

Preferably, parameters other than a TCI state and a CORESET identifier may be configured to be identical in the first CORESET and the second CORESET.

Preferably, a step of receiving configuration information from a base station may be further included, the configuration information may include information for informing that the first search space set and the second search space set are used for repeated transmission through the plurality of PDCCH candidates of the DCI.

Preferably, a step of reporting, by the terminal, a capability including a maximum number of control resource sets (CORESET) configurable to the terminal to the base station may be further included, by counting a number of CORESETs differently based on a number of TCI states configured in CORESET, one or more CORESETs may be configured in the terminal within the maximum number.

Advantageous Effects

According to an embodiment of the present disclosure, reliability for DCI (PDCCH) transmission can be improved by repeatedly transmitting or dividedly and transmitting the same DCI (PDCCH) from a plurality of TRPs.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
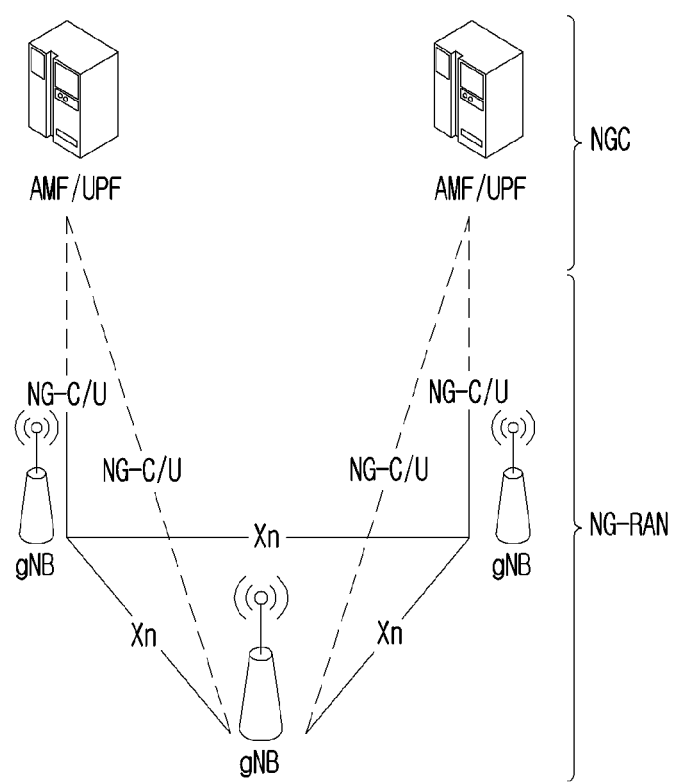
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated with a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management

CQI: Channel Quality Indicator

CRI: channel state information—reference signal resource indicator

CSI: channel state information

CSI-IM: channel state information—interference measurement
CSI-RS: channel state information reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
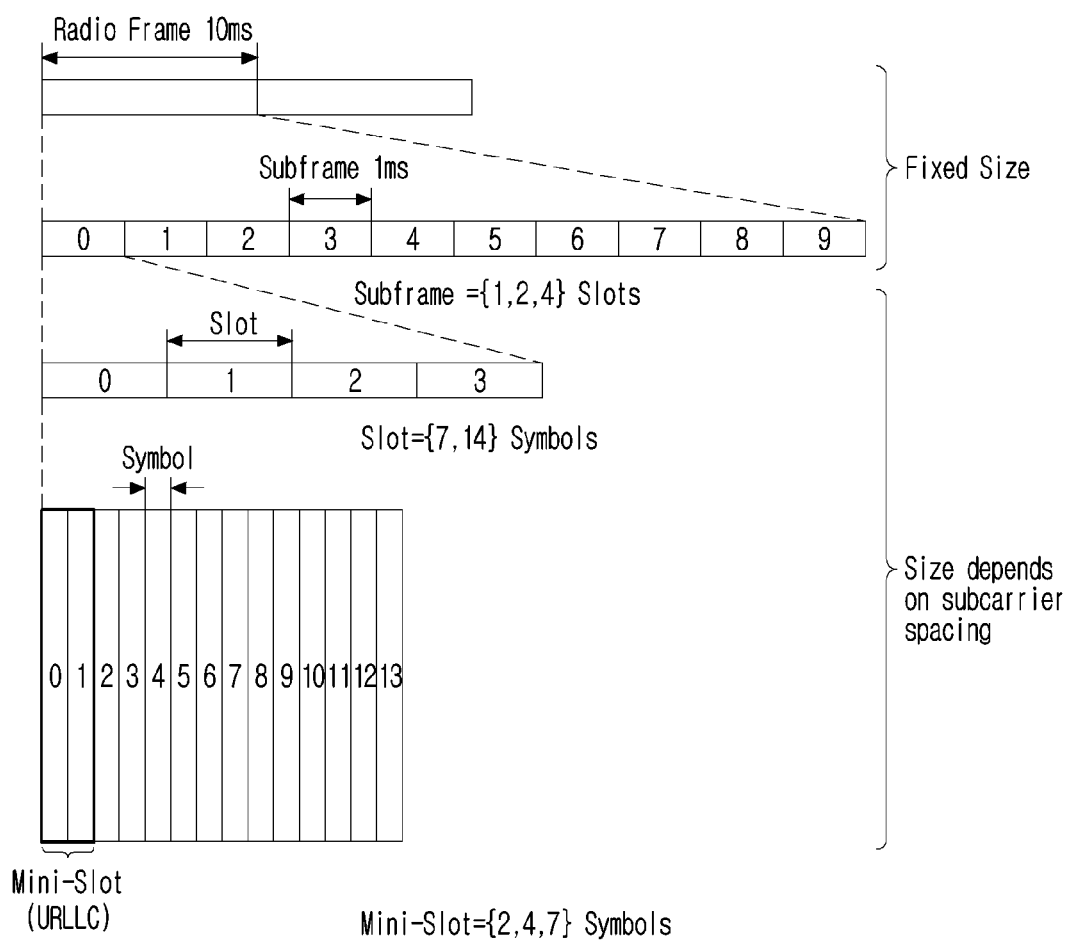
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
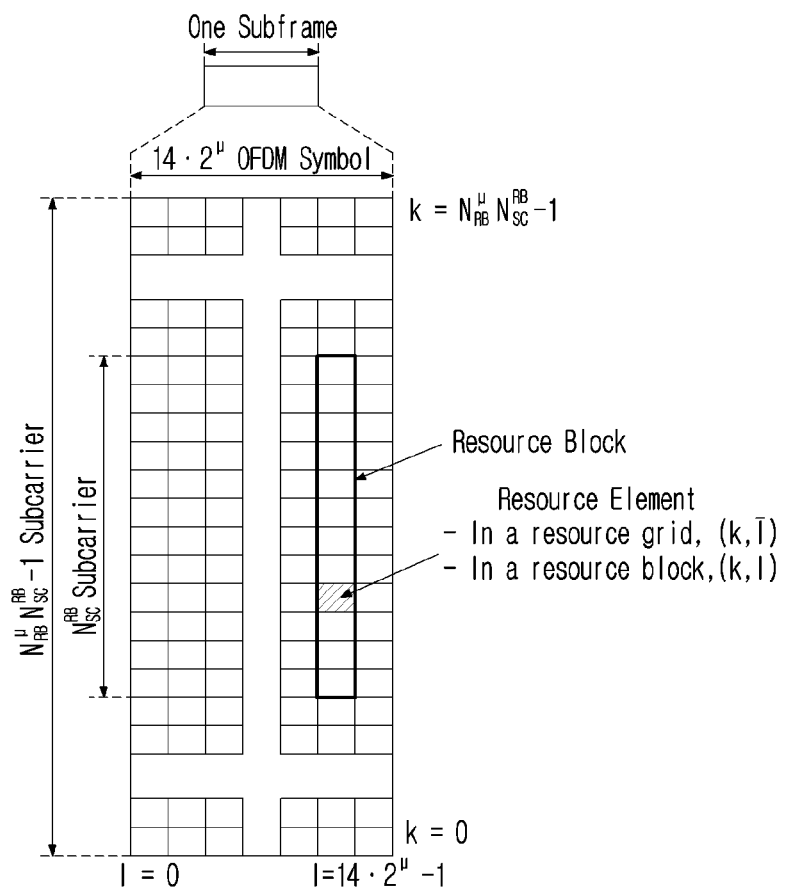
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration p is identical to 'point A'. A relationship between a common resource block number $n_{CRB}^\mu$ and a resource element (k,l) for a subcarrier spacing configuration p in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \qquad \text{[Equation 2]}$$

$N_{BWP,i}^{start,\mu}$ is a common resource block that a BWP starts relatively to common resource block 0.

Figure 4:
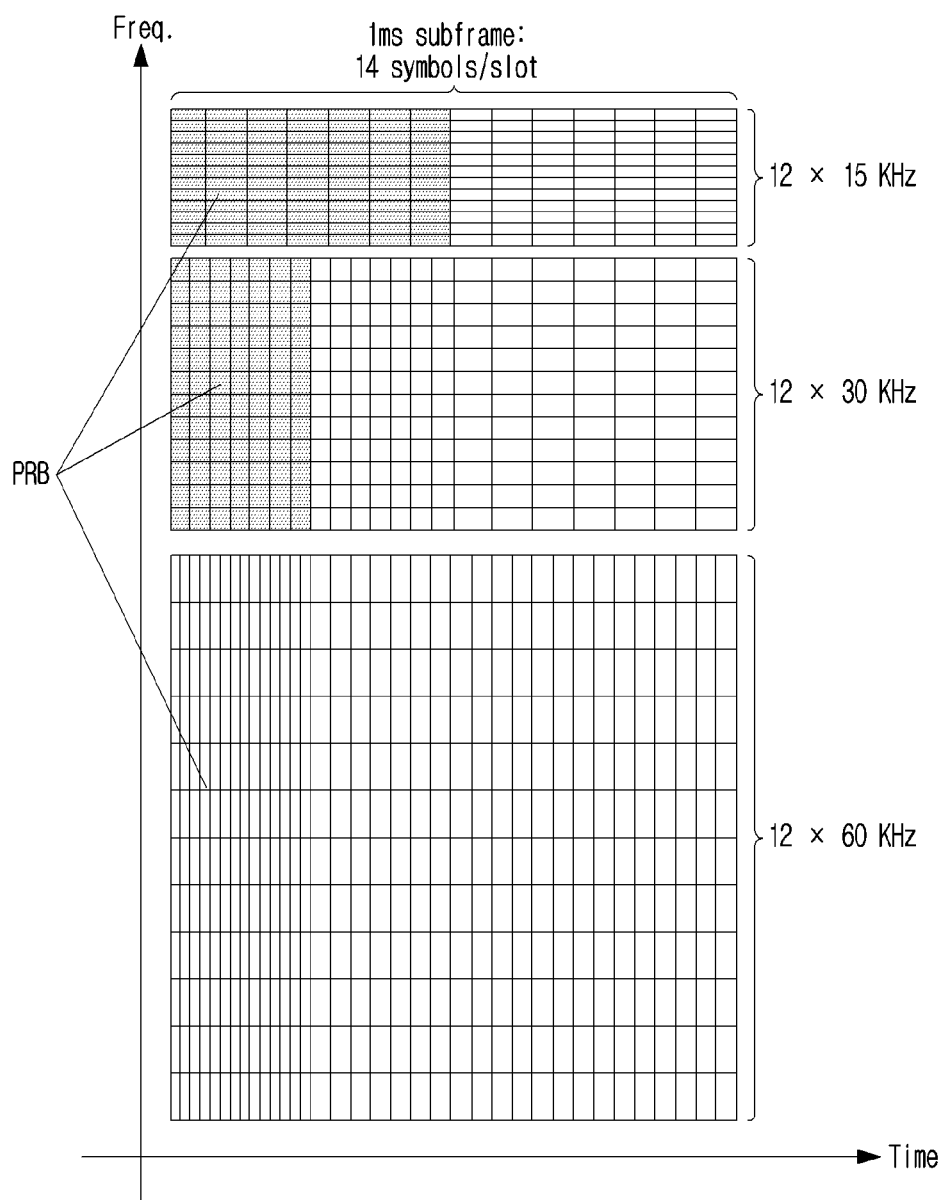
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
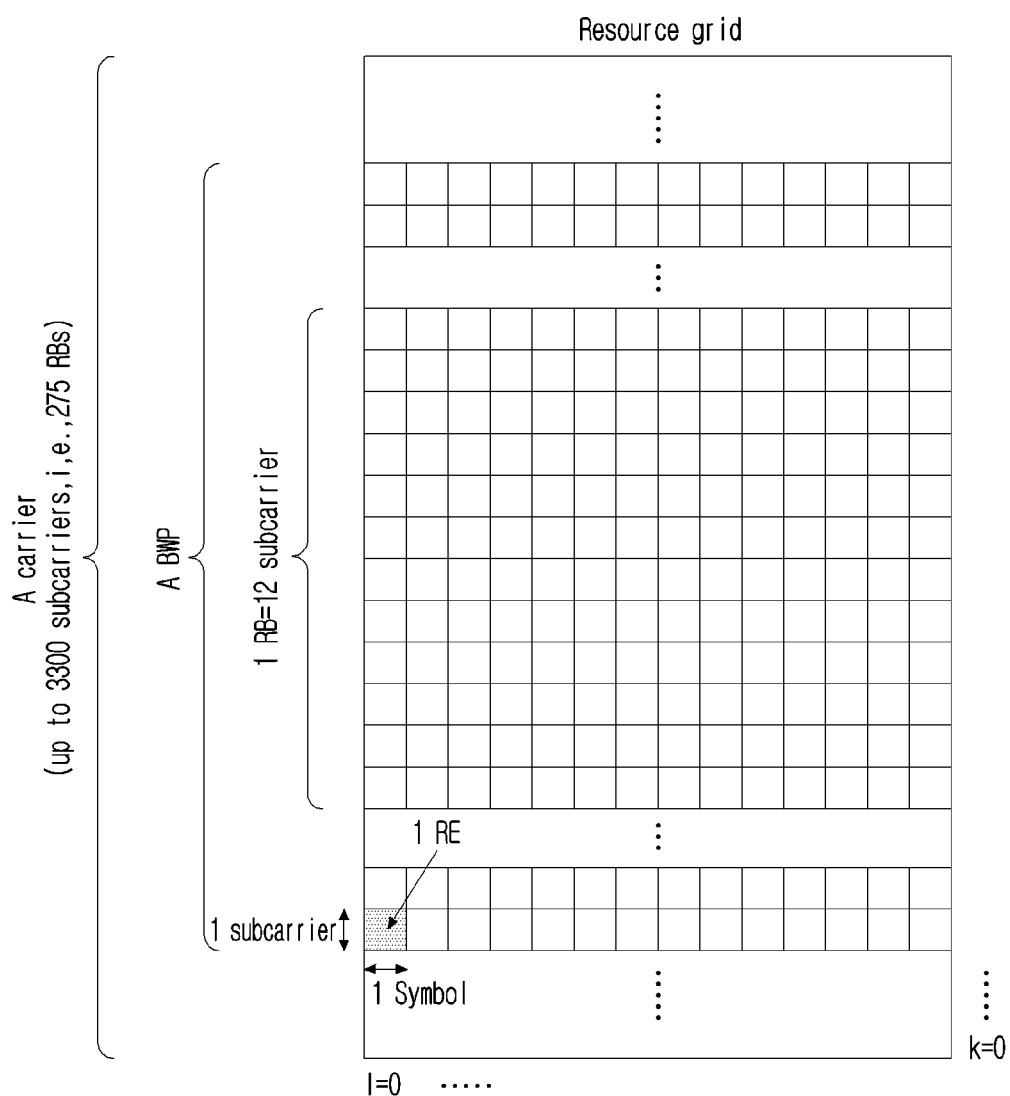
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
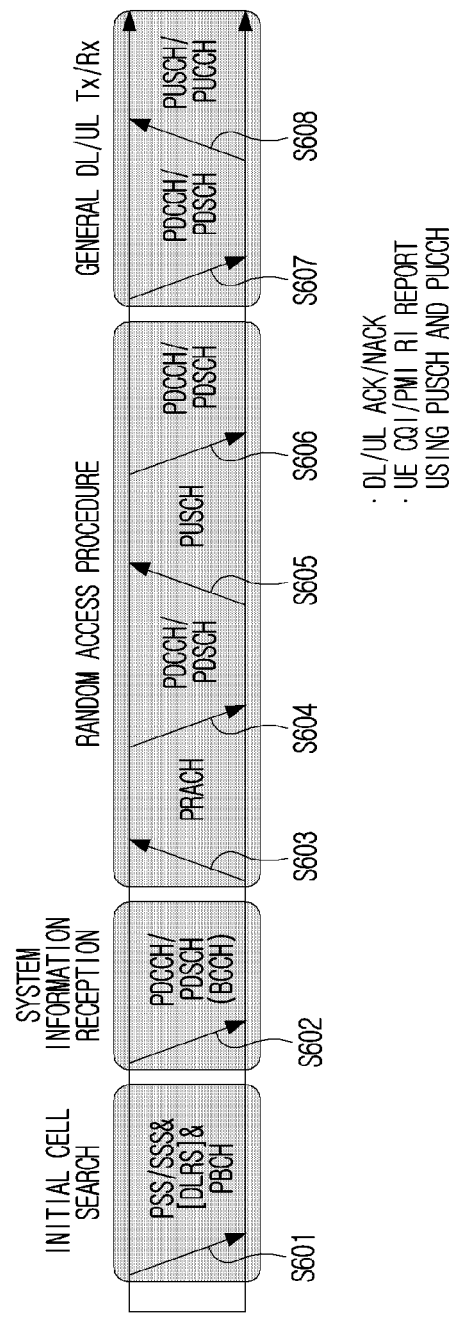
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station.

Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
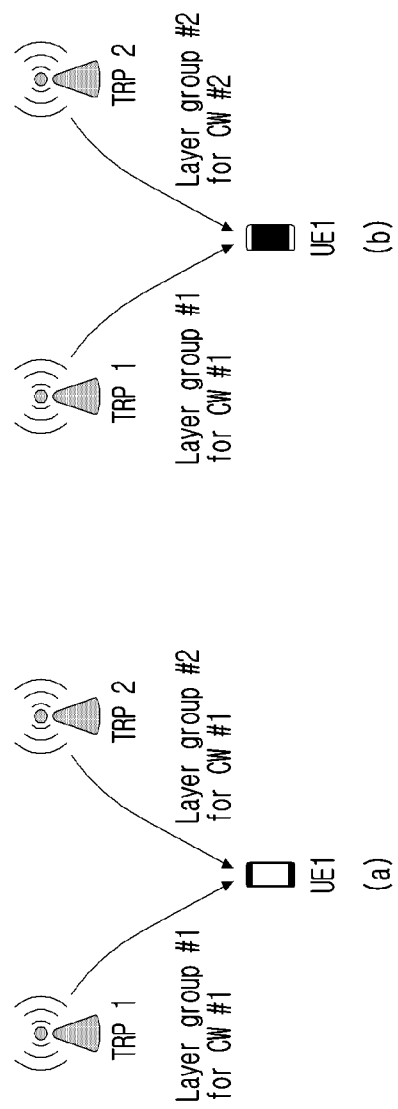
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot 1-a) Method 1a
- The same TB is transmitted in one layer or layer set at each transmission time (occasion) and each layer or each layer set is associated with one TCI and one set of DMRS port(s).
- A single codeword having one RV is used in all spatial layers or all layer sets. With regard to UE, different coded bits are mapped to a different layer or layer set by using the same mapping rule.

1-b) Method 1b
- The same TB is transmitted in one layer or layer set at each transmission time (occasion) and each layer or each layer set is associated with one TCI and one set of DMRS port(s).
- A single codeword having one RV is used in each spatial layer or each layer set. RV(s) corresponding to each spatial layer or each layer set may be the same or different.

1-c) Method 1c
- The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency resource allocation is not overlapped and n (n<=Nf) TCI states in a single slot
- Each non-overlapping frequency resource allocation is associated with one TCI state.
- The same single/multiple DMRS port(s) are associated with all non-overlapping frequency resource allocation.

2-a) Method 2a
- A single codeword having one RV is used for all resource allocation. With regard to UE, common RB matching (mapping of a codeword to a layer) is applied to all resource allocation.

2-b) Method 2b
- A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time resource allocation is not overlapped and n (n<=Nt1) TCI states in a single slot
- Each transmission time (occasion) of a TB has time granularity of a mini-slot and has one TCI and one RV.
- A common MCS is used with a single or multiple DMRS port(s) at all transmission time (occasion) in a slot.
- A RV/TCI may be the same or different at a different transmission time (occasion).

4) Method 4 (TDM): n (n<=Nt2) TCI states in K (n<=K) different slots
- Each transmission time (occasion) of a TB has one TCI and one RV.
- All transmission time (occasion) across K slots uses a common MCS with a single or multiple DMRS port(s).
- A RV/TCI may be the same or different at a different transmission time (occasion).

Hereinafter, MTRP URLLC will be described.

In the present disclosure, DL MTRP-URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. A UE configured with a DL MTRP-URLLC transmission method receives the same data/DCI by using a different layer/time/frequency resource. Here, UE is configured which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. A UE may achieve high reliability because it receives the same data/DCI through resource 1 and resource 2. Such DL MTRP URLLC may be applied to a PDSCH/a PDCCH.

In addition, in the present disclosure, UL MTRP-URLLC means that multiple TRPs receive the same data/UCI (uplink control information) from a UE by using a different layer/time/frequency resource. For example, TRP 1 receives the same data/DCI from a UE in resource 1 and TRP 2 receives the same data/DCI from a UE in resource 2 and shares received data/DCI through a backhaul link connected between TRPs. A UE configured with a UL MTRP-URLLC transmission method transmits the same data/UCI by using a different layer/time/frequency resource. Here, a UE is configured which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in the present disclosure, the meaning of using (or mapping) a specific TCI state (or a TCI) when receiving data/DCI/UCI for any frequency/time/space resource is as follows. In case of DL, it may mean that a channel is estimated from a DMRS by using a QCL type and a QCL RS indicated by a corresponding TCI state in a frequency/time/spatial resource (layer), and data/DCI is received/demodulated based on the estimated channel. In addition, in case of UL, it may mean that a DMRS and data/UCI are transmitted/modulated using a Tx beam and/or power indicated by a corresponding TCI state in a frequency/time/space resource.

Here, a UL TCI state has Tx beam and/or Tx power information of a UE and spatial relation information, etc. instead of a TCI state may be configured to a UE through other parameters. A UL TCI state may be directly indicated by UL grant DCI or may mean spatial relation information of an SRS resource indicated by an SRI (sounding resource indicator) field of UL grant DCI. Alternatively, it may mean an OL (open loop) Tx power control parameter associated with a value indicated by a SRI field of UL grant DCI (j: an index for open loop parameter Po and α (up to 32 parameter value sets per cell), q_d: an index of a DL RS resource for PL (pathloss) measurement (measurement of up to 4 per cell), l: a closed loop power control process index (up to 2 processes per cell)).

Hereinafter, MTRP eMBB will be described.

In the present disclosure, MTRP-eMBB means that multiple TRPs transmit other data (e.g., other TB) by using a different layer/time/frequency. A UE configured with a MTRP-eMBB transmission method is indicated multiple TCI states by DCI and the UE assumes that data received by using a QCL RS of each TCI state is different data.

Meanwhile, whether of MTRP URLLC transmission/reception or MTRP eMBB transmission/reception may be understood by a UE by separately classifying a RNTI for MTRP-URLLC and a RNTI for MTRP-eMBB and using them. In other words, when CRC masking of DCI is performed by using a RNTI for URLLC, a UE considers as URLLC transmission and when CRC masking of DCI is performed by using a RNTI for eMBB, a UE considers as eMBB transmission. Alternatively, a base station may configure MTRP URLLC transmission/reception or may configure MTRP eMBB transmission/reception to a UE through other new signaling.

In the description of the present disclosure, for convenience of a description, it is described by assuming cooperative transmission/reception between 2 TRPs, but it may be extended and applied in 3 or more multi-TRP environments and it may be also extended and applied in multi-panel environments (i.e., a TRP corresponds to a panel). A different TRP may be recognized by a UE as a different TCI state and when a UE receives/transmits data/DCI/UCI by using TCI state 1, it means that data/DCI/UCI is received/transmitted from/to TRP 1.

The methods proposed in the present disclosure may be utilized in a situation where MTRP cooperatively transmits a PDCCH (the same PDCCH is repetitively or partitively transmitted). In addition, the methods proposed in the present disclosure may be utilized even in a situation where MTRP cooperatively transmits a PDSCH or cooperatively receives a PUSCH/PUCCH.

In addition, in the present disclosure, when a plurality of base stations (i.e., MTRP) repetitively transmit the same PDCCH, it may mean the same DCI is transmitted by a plurality of PDCCH candidates and it means that a plurality of base stations repetitively transmit the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI, and if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRP) partitively transmit the same PDCCH, it means that one DCI is transmitted by one PDCCH candidate and some resources that that PDCCH candidate is defined are transmitted by TRP 1 and remaining resources are transmitted by TRP 2.

In addition, in the present disclosure, when a UE repetitively transmits the same PUSCH so that a plurality of base stations (i.e., MTRP) can receive it, it may mean that the same data is transmitted by a plurality of PUSCHs. Here, each PUSCH may be optimized for an UL channel of a different TRP and transmitted. For example, when a UE repetitively transmits the same data through PUSCH 1 and 2, PUSCH 1 is transmitted by using UL TCI state 1 for TRP 1, and a value which is optimized for a channel of TRP 1 may also be scheduled/applied for link adaptation such as a precoder/MCS, etc. PUSCH 2 is transmitted by using UL TCI state 2 for TRP 2, and a value which is optimized for a channel of TRP 2 may also be scheduled/applied for link adaptation such as a precoder/MCS, etc. Here, PUSCH 1 and 2 which are repetitively transmitted may be transmitted at a different time to be time division multiplexed (TDM), frequency division multiplexed (FDM), spatial division multiplexed (SDM).

In addition, in the present disclosure, when a UE partitively transmits the same PUSCH so that a plurality of base stations (i.e., MTRP) will receive it, it means that one data is transmitted by one PUSCH, but a resource allocated to the PUSCH may be divided to optimize and transmit it for UL channels of different TRPs. For example, a UE transmits the same data through 10 symbol PUSCHs, data may be transmitted in 5 previous symbols by using UL TCI state 1 for TRP 1, and a value which is optimized for a channel of TRP 1 may be scheduled/applied for link adaptation such as a precoder/MCS, etc. The remaining data may be transmitted in the remaining 5 symbols by using UL TCI state 2 for TRP 2, and a value which is optimized for a channel of TRP 2 may be scheduled/applied for link adaptation such as a precoder/MCS, etc. In the example, transmission for TRP 1 and transmission for TRP 2 are time division multiplexed (TDM) by dividing one PUSCH into time resources, but it may be transmitted by other FDM/SDM method.

Similar to PUSCH transmission described above, a UE may repetitively transmit or partitively transmit the same PUCCH so that a plurality of base stations (i.e., MTRP) can receive the PUCCH.

A proposal of the present disclosure may be extended and applied to a variety of channels such as a PUSCH/PUCCH/PDSCH/PDCCH, etc.

MTRP (Multi-TRP)-URLLC is a technique in which multiple TRPs (MTRP: Multiple TRP) transmit the same data using different layer/time/frequency resources. Here, the data transmitted in each TRP is transmitted using a different TCI state for each TRP.

If this is extended to a method in which MTRP transmits the same DCI using different PDCCH candidates, PDCCH candidates in which the same DCI is transmitted from each TRP may be transmitted using different TCI states. Here, in this case, a detailed definition for a method of configuring a CORESET, a search space (SS) set for each PDCCH candidate, etc.

Embodiment 1

In embodiment 1, a method for repeatedly transmitting a PDCCH by a plurality of base stations (i.e., MTRP) is described.

When a plurality of base stations (i.e., MTRP) repeatedly transmits a PDCCH, the number of repeated transmissions R may be directly indicated by a base station to a UE, or may be mutually agreed. Here, when the number of repeated transmissions R is mutually agreed, the number of repeated transmissions R may be determined based on the number of transmission configuration indication (TCI) states configured to repeatedly transmit the same PDCCH. For example, if a base station configures r TCI states to repeatedly transmit the same PDCCH to a UE, R=r may be agreed. Here, for example, R=M*r is configured, and a base station may indicate M to a UE.

When a plurality of base stations (i.e., MTRP) repeatedly transmits the same PDCCH, TRP 1 may transmit DCI through PDCCH candidate 1, and TRP 2 may transmit the same DCI through PDCCH candidate 2. The mapping order of TRP and PDCCH candidates is for convenience of description only and does not limit the technical scope of the present disclosure. Since each PDCCH candidate is transmitted by a different TRP, each PDCCH candidate is received using a different TCI state. Here, PDCCH candidates transmitting the same DCI may have some or all of a scrambling/aggregation level of the PDCCH, CORESET, and a search space (SS) set.

Two (or two or more) PDCCH candidates repeatedly transmitted by a plurality of base stations (i.e., MTRP) may be recognized/indicated to a UE through the following configuration.

Hereinafter, for convenience of description, the same DCI is transmitted/received through two PDCCH candidates as an example, but even when the same DCI is transmitted/received through 3 or more PDCCH candidates, a proposal of the present disclosure is extended can be applied. In this case, reliability can be further increased. For example, TRP 1 may transmit the same DCI through PDCCH candidates 1 and 2, and TRP 2 may transmit the same DCI through PDCCH candidates 3 and 4, respectively.

In addition, a base station may indicate to a UE that with respect to SS set (s) in which a plurality of base stations (i.e., MTRP) repeatedly transmit the same PDCCH, the same PDCCH only for some DCI format/SS/RNTI type defined in an SS set may be repeatedly transmitted, and for the rest, it may not be repeatedly transmitted. For example, a base station may indicate to a UE that only DCI format 1-0 (or 1-1) is repeatedly transmitted for an SS set in which both DCI formats 1-0 and 1-1 are defined. Alternatively, a base station may indicate to a UE that repeated transmission is performed only for a common SS (or a UE specific SS) among the UE-specific SS and the common SS. Alternatively, a base station may indicate to a UE that the same PDCCH is repeatedly transmitted only for DCI that is CRC masked with a specific RNTI (e.g., RNTIs other than C-RNTI, MCS-C-RNTI, CS-RNTI).

Figure 8:
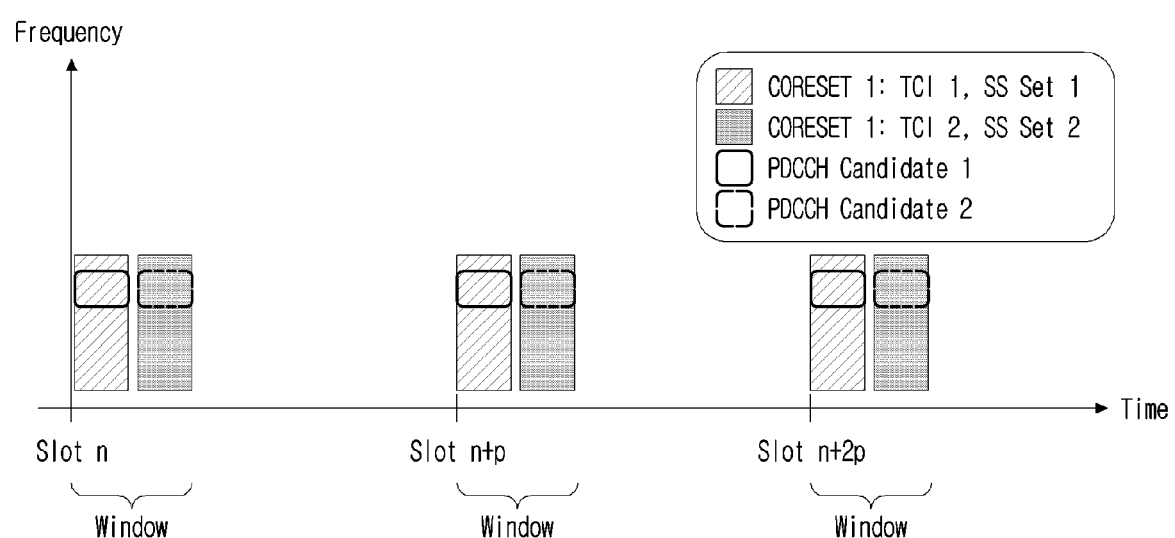
FIG. 8 is a diagram illustrating a method for transmitting and receiving downlink control information according to an embodiment of the present disclosure.

Embodiment 1-1) Although Two PDCCH
Candidates Transmitting the Same DCI Share One
(Same) CORESET, they May be
Defined/Configured in Different SS Sets FIG. 8 is a diagram illustrating a method for transmitting and receiving downlink control information according to an embodiment of the present disclosure.

Referring to FIG. 8, PDCCH candidate 1 may be transmitted using TCI state 1, and PDCCH candidate 2 may be transmitted using TCI state 2. In addition, the same DCI may be transmitted through PDCCH candidate 1 and PDCCH candidate 2, respectively. In addition, both PDCCH candidate 1 and PDCCH candidate 2 may be transmitted (repeatedly) at a specific period (P) interval in a time domain.

Each PDCCH candidate shares the same CORESET, but may be defined/configured in different SS sets. In addition, among two TCI states set in the same CORESET, TCI state 1 may be used in SS Set 1 in which PDCCH candidate 1 exists, and TCI state 2 may be used in SS Set 2 in which PDCCH candidate 2 exists.

In the current standard, a CORESET ID is configured in an SS set, and the corresponding SS set and the CORESET are associated. According to an embodiment of the present disclosure, one CORESET may be associated (mapped) to a plurality of TCI states (e.g., two TCI states). In this case, in configuration for a SS set, not only the CORESET ID but also information on which TCI of the two TCIs of the corresponding CORESET should be used to decode a PDCCH may be defined/configured together.

Also, a base station may inform a UE at which time (transmission occasion (TO)) a PDCCH candidate of SS set 1 and a PDCCH candidate of SS set 2 corresponding to the same DCI are transmitted/received. This may be defined/referred to as a window through which the same DCI is transmitted. For example, a base station may indicate to a UE that SS set 1 and SS set 2 defined in the same single slot (i.e., window=1 slot) to the UE are SS sets in which the same DCI is transmitted, or it may be mutually agreed upon between the base station and the UE.

More generally, a window (e.g., 1 slot) through which the same DCI is transmitted may be indicated to a UE by a base station, or may be mutually agreed upon between the base station and the UE.

For example, it may be mutually agreed between a base station and a UE or may be configured to a UE by a base station that the window (e.g., n time) starts every TO (an occasion when a PDCCH candidate is transmitted) of a reference set (e.g., lowest identifier (ID) SS set) among SS sets defined to transmit the same DCI. Here, if the TO of the lowest ID SS set appears multiple times within one window, the windows may overlap, so to prevent this, the next (n+1) window may be defined/configured based on the TO of the lowest ID SS set not included in a specific (n) window. In addition, preferably, N windows may be defined for each period of a reference set (e.g., the lowest ID SS set). Here, N may be indicated by a base station to a UE. For example, if a period is 10 slots, SS sets are defined in the 1st, 2nd, and 3rd slots among 10 slots, and a window is 1 slot and N=2, each window may be defined in the 1st and 2nd slots during every period of the lowest ID SS set.

Hereinafter, a mapping method between PDCCH TOs and TCIs within one window will be described.

Figure 9:
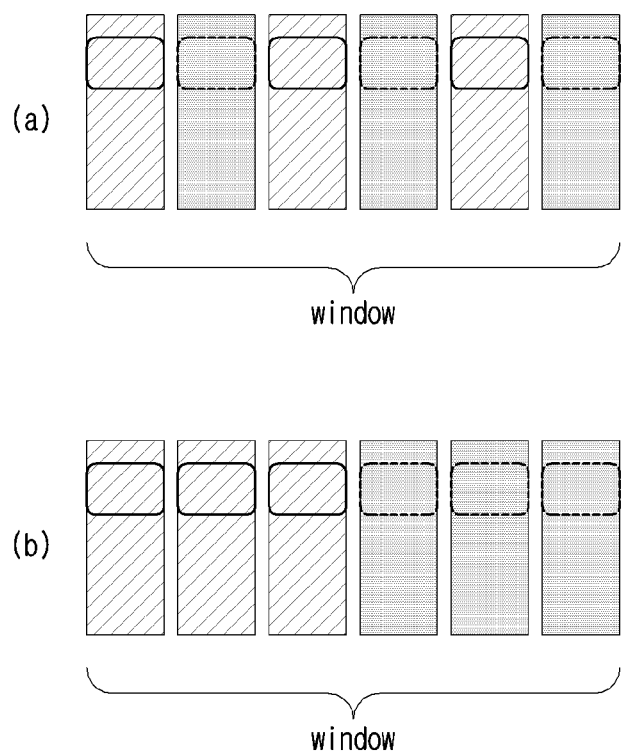
FIG. 9 is a diagram illustrating a mapping method between a PDCCH transmission occasion and a TCI state according to an embodiment of the present disclosure.

FIG. 9 is a diagram illustrating a mapping method between PDCCH transmission occasions and TCI states according to an embodiment of the present disclosure.

Several PDCCH TOs exist in one window, and different TCI states may be mapped for each TO. Here, the following two schemes may be considered as a mapping scheme of TOs and TCIs.

First, as a TO increases within a window (in ascending order), TCI states may be sequentially mapped in a circular manner. For example, if N TOs and M TCI states are indicated in a window, i-th TO is mapped to i-th TCI, and if N>M, the first (1st) TCI and the second (2nd) TCI may be sequentially mapped to the (M+1)th and (M+2)th TOs, respectively. For example, it is assumed that 6 PDCCH TOs are configured in one window and 2 TCI states are configured as shown in FIG. 9(*a*). In this case, in one window, the first TCI state may be mapped to the first PDCCH TO, the second TCI state may be mapped to the second PDCCH TO, the first TCI state may be mapped to the third PDCCH TO, the second TCI state may be mapped to the fourth PDCCH TO, the first TCI state may be mapped to the fifth PDCCH TO, and the second TCI state may be mapped to the sixth PDCCH TO.

Alternatively, secondly, by grouping adjacent floor(N/M) (floor(x) is the largest integer not greater than x) or ceil(N/M) (ceil(x) is the smallest not less than x) TOs in a window, groups and TCI states may be sequentially mapped in a circular manner. That is, group i may be mapped to CORESET i. As a result, the same TCI may be mapped to adjacent TOs included in the same group. For example, it is assumed that 6 PDCCH TOs are configured in one window and 2 TCI states are configured as shown in FIG. 9(b). In addition, it is assumed that the first to third PDCCH TOs are grouped into a first group, and the fourth to sixth PDCCH TOs are grouped into a second group. In this case, within one window, the first TCI state may be mapped to the first PDCCH TO to the third PDCCH TO (i.e., the first group), and the second TCI state may be mapped to the fourth PDCCH TO to the sixth PDCCH TO (i.e., the second group).

Such a mapping method between TOs and TCIs may be applied to mapping between TOs and TCIs within the same window not only in the case of the above-described embodiment 1-1, but also a general case in which the PDCCH is repeatedly transmitted at different times (e.g., embodiment 1-3) or dividedly transmitted at different times. In other words, as described above, the mapping method of TOs and TCIs may be applied to all cases in which different PDCCH candidates (to which different TCI states are applied) are transmitted in different TOs within the same window.

Embodiment 1-1 described above may be configured as a special case of embodiment 1-3 to be described below. That is, when CORESETs 1 and 2 are configured identically (however, the TCI state and CORESET ID defined in the CORESET are different) in the method of configuring CORESETs 1, 2 and SS sets 1, 2 as in embodiment 1-3, it is not different from embodiment 1-1 in which one CORESET, two SS sets, and two TCIs are configured. Therefore, when CORESETs 1 and 2 are identically configured in embodiment 1-3, the same PDCCH may be repeatedly transmitted in the same manner as in embodiment 1-1.

Figure 10:
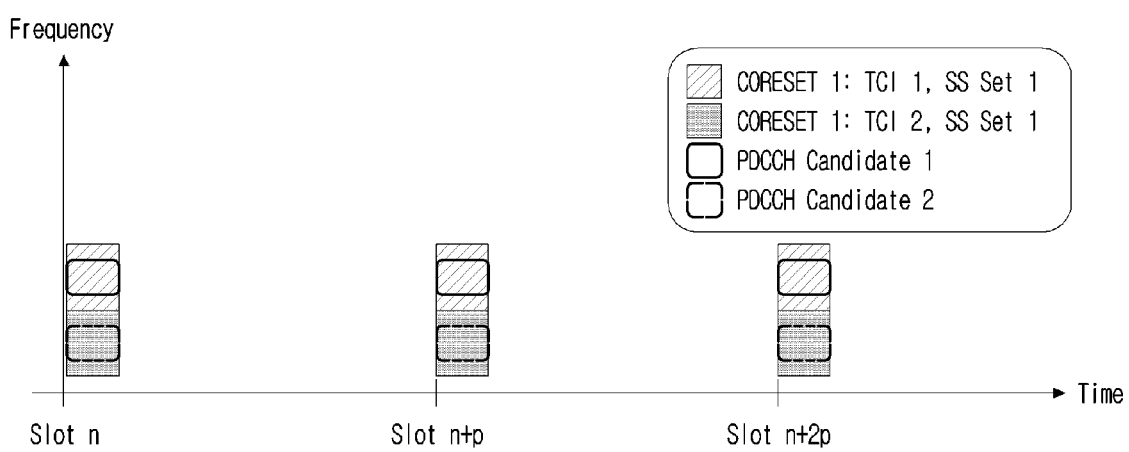
FIG. 10 is a diagram illustrating a method for transmitting and receiving downlink control information according to an embodiment of the present disclosure.

Embodiment 1-2) Two PDCCH Candidates Transmitting the Same DCI May be Defined/Configured in One (Same) CORESET and One (Same) SS Set FIG. 10 is a diagram illustrating a method for transmitting and receiving downlink control information according to an embodiment of the present disclosure.

Referring to FIG. 10, PDCCH candidate 1 may be transmitted using TCI state 1, and PDCCH candidate 2 may be transmitted using TCI state 2. In addition, the same DCI may be transmitted through PDCCH candidate 1 and PDCCH candidate 2, respectively. In addition, both PDCCH candidate 1 and PDCCH candidate 2 may be transmitted (repeatedly) at a specific period (P) interval in a time domain.

Referring to FIG. 10, each PDCCH candidate may share the same CORESET and the same SS set, and FDM may be applied to PDCCH candidates 1 and 2. Both PDCCH candidates 1 and 2 may be defined/configured in one SS set and one CORESET mapped to the SS set. In this case, one of the two TCI states defined/configured in the CORESET may be used for some PDCCH candidates, and the remaining TCI state may be used for the remaining PDCCH candidates. For this, the mapping method between PDCCH candidates to TCIs may be referred to above.

For example, when there are 4 PDCCH candidates of aggregation level=4, TCI state 1 is mapped to the 1st and 3rd candidates, and TCI state 2 is mapped to the 2nd and 4th candidates, so that the TCI state may be mapped alternately. Here, PDCCH candidate 1 may exist among the first and third candidates, and PDCCH candidate 2 may exist among the second and fourth candidates. Alternatively, TCI state 1 is mapped to the 1st and 2nd candidates, and TCI state 2 is mapped to the 3rd and 4th candidates, so that the candidates of the previous half and the candidates of the following half may be mapped to different TCI states. Here, PDCCH candidate 1 may exist among the first and second candidates, and PDCCH candidate 2 may exist among the third and fourth candidates.

Extending the above example, similarly, for N TCI states, the N TCI states may be mapped one by one as the candidate index increases in a circular manner. Alternatively, all candidates may be divided into N groups by adjacent candidates (adjacent candidate indexes), and N candidate groups and N TCI states may be mapped 1:1.

In addition, in this method, a window in which the same PDCCH is repeatedly transmitted may be determined for every transmission occasion (TO) in which the PDCCH is transmitted/received. That is, for each PDCCH TO appearing in slots n, n+P, n+2P, etc., PDCCH candidates 1 and 2 may be FDMed and transmitted repeatedly. FIG. 10 exemplifies a case in which a period of an SS set is configured to P slot and one SS set is configured during one period of SS set. In addition, an SS set may be configured in several (continuous) slots within one period of SS set, or several SS sets may be configured in one slot as well.

For example, an SS set may be configured in (continuous) N slots for every period through a duration field (=N) defined in the SS set. A base station and a UE may agree the N slots configured in this way as one window. In this case, a TCI state may be mapped to each PDCCH TO through 'the mapping method between PDCCH TOs and TCIs within a window' described above. For example, when N=2, a SS set may be configured in the scheme shown in FIG. 9 above.

As another example, multiple SS sets in one slot may be configured through a higher layer field (e.g., monitoringSymbolsWithinSlot field) defined in a configuration of an SS set. For example, an SS set is defined/configured with a P slot period, and L SS sets may exist at different times in a slot in which the SS set is configured. In this case, a base station and a UE may agree a window as 1 slot, and the TCI state may be mapped to each PDCCH TO through 'the mapping method between PDCCH TOs and TCIs within a window' described above.

Alternatively, embodiment 1-2 described above may be configured as a special case of embodiment 1-3 to be described below. That is, when CORESETs 1 and 2 are configured identically (however, the TCI state and CORESET ID defined in the CORESET are different) and SS sets 1 and 2 are configured identically in the method of configuring CORESETs 1, 2 and SS sets 1, 2 as in embodiment 1-3, it is not different from embodiment 1-2 in which one CORESET, one SS set, and two TCIs are configured. Therefore, in this case, the same PDCCH may be repeatedly transmitted in the same manner as in embodiment 1-1.

In addition, similarly to the above, embodiment 1-2 may be configured as a special case of embodiment 1-4. That is, when CORESETs 1 and 2 are configured identically (however, the TCI state defined in the CORESET is different) in the method of configuring CORESETs 1 and 2 and SS set 1 as in Example 1-4, it is not different from embodiment 1-2.

In addition, embodiment 1-2 may be configured as a special case of embodiment 1-1. That is, when SS set 1 and 2 are configured identically (however, the TCI state and CORESET ID of the CORESET used in each SS are different) in the method of configuring CORESET 1 and SS sets 1 and 2 as in embodiment 1-1, it is not different from embodiment 1-2 in which one CORESET, one SS set, and two TCIs are set. Therefore, in this case, the same PDCCH may be repeatedly transmitted in the same manner as in embodiment 1-2.

Figure 11:
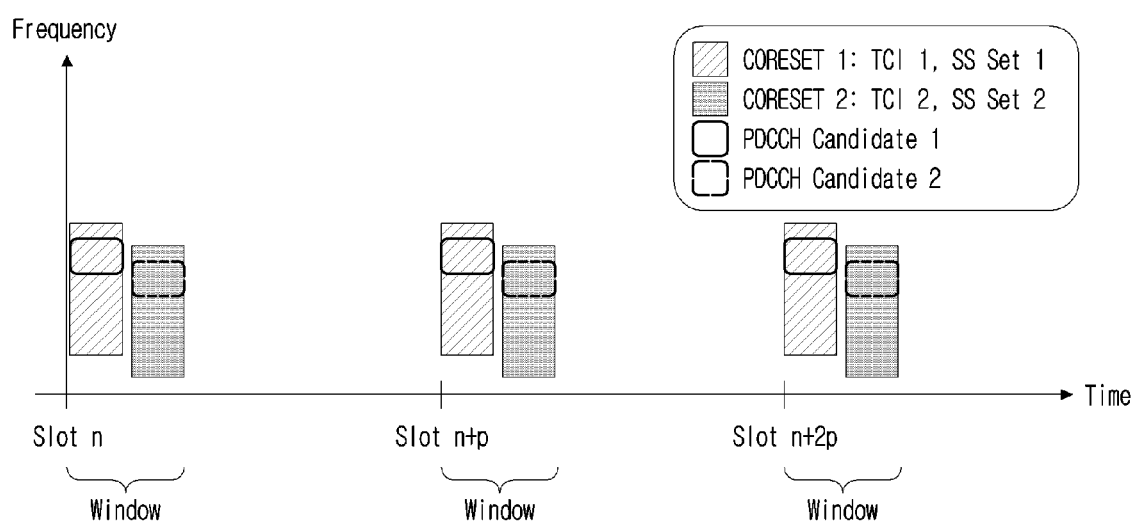
FIG. 11 is a diagram illustrating a method for transmitting and receiving downlink control information according to an embodiment of the present disclosure.

Embodiment 1-3) Two PDCCH Candidates Transmitting the Same DCI May be Defined/Configured in Different CORESETs, and May be Defined/Configured in Different SS Sets FIG. 11 is a diagram illustrating a method for transmitting and receiving downlink control information according to an embodiment of the present disclosure.

Referring to FIG. 11, PDCCH candidate 1 may be transmitted using TCI state 1, and PDCCH candidate 2 may be transmitted using TCI state 2. In addition, the same DCI may be transmitted through PDCCH candidate 1 and PDCCH candidate 2, respectively. In addition, both PDCCH candidate 1 and PDCCH candidate 2 may be transmitted (repeatedly) at a specific period (P) interval in a time domain.

Referring to FIG. 11, CORESET 1 is mapped to SS set 1, CORESET 2 is mapped to SS set 2, PDCCH candidate 1 is transmitted through CORESET 1 and SS set 1, and PDCCH candidate 2 is CORESET 2 and SS set 2. For this configuration, a base station should inform a UE that the corresponding CORESET group or SS set group is configured for transmitting the same DCI. For example, an ID of SS set 2 (and/or 1) used for transmitting the same DCI in SS set 1 (and/or 2) may be additionally configured. Alternatively, a base station may indicate a UE that multiple SS sets are the same group, and the UE may recognize/assume that SS sets belonging to the same group are configured for transmitting the same DCI.

Since a window configuration method in which the same DCI is transmitted is the same as the configuration method of embodiment 1-1 described above, the configuration method of embodiment 1-1 may be used as it is.

Figure 12:
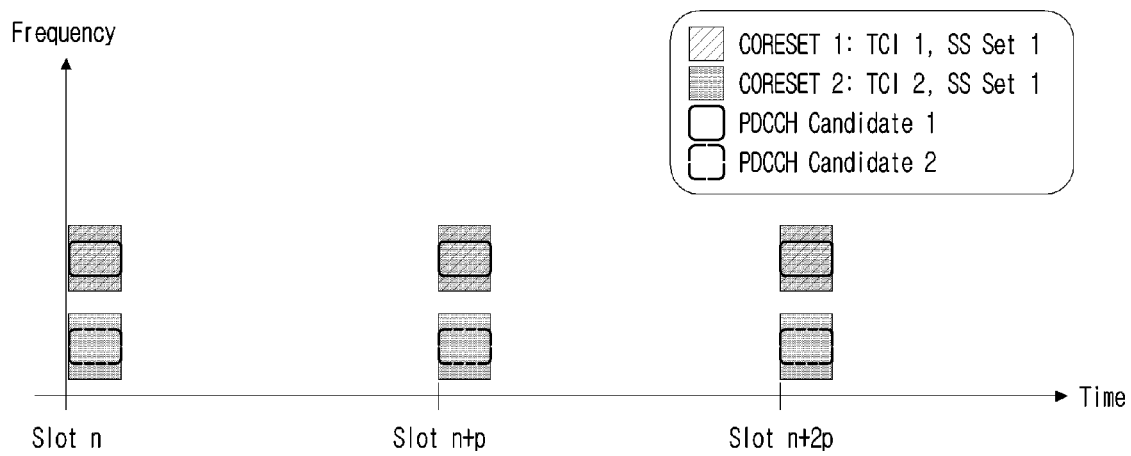
FIG. 12 is a diagram illustrating a method for transmitting and receiving downlink control information according to an embodiment of the present disclosure.

Embodiment 1-4) Although Two PDCCH Candidates Transmitting the Same DCI are Defined/Configured in Different CORESETs, they May be Defined/Configured in One (Same) SS Set FIG. 12 is a diagram illustrating a method for transmitting and receiving downlink control information according to an embodiment of the present disclosure.

Referring to FIG. 12, PDCCH candidate 1 may be transmitted using TCI state 1, and PDCCH candidate 2 may be transmitted using TCI state 2. In addition, the same DCI may be transmitted through PDCCH candidate 1 and PDCCH candidate 2, respectively. In addition, both PDCCH candidate 1 and PDCCH candidate 2 may be transmitted (repeatedly) at a specific period (P) interval in a time domain.

Referring to FIG. 12, two CORESETs having different resource block (RB) resources are mapped to one SS set, and candidates 1 and 2 may be defined in CORESET 1 and CORESET 2, respectively.

In addition, in this method, a window in which the same PDCCH is repeatedly transmitted is determined for every transmission occasion (TO) in which the PDCCH is transmitted/received. That is, for each PDCCH TO appearing in slot n, n+P, n+2P, etc., PDCCH candidates 1 and 2 may be FDMed and repeatedly transmitted.

FIG. 12 illustrates a case in which a period of an SS set is configured with a P slot, and one SS set is configured during one period. In addition, an SS set may be configured in several (continuous) slots within one period of an SS set, or several SS sets may be configured in one slot as well.

For example, an SS set may be configured in (continuous) N slots for every period through a duration field (=N) defined in an SS set. A base station and a UE may agree the N slots configured in this way as one window.

Hereinafter, a mapping method between PDCCH TOs and CORESETs within a window is described.

Several PDCCH TOs may exist in one window, and different CORESETs may be mapped for each PDCCH TO. As a mapping between PDCCH TOs and CORESETs, the following two schemes may be considered.

First, as a TO increases within a window, CORESETs may be sequentially mapped in a circular manner. For example, if N TOs and M CORESETs defined in the SS set are indicated in a window, i-th TO is mapped to i-th CORESET, and if N>M, the first (1st) CORESET and the second (2nd) CORESET may be sequentially mapped to the (M+1)th and (M+2)th TOs in a circular manner, respectively. For example, it is assumed that 6 PDCCH TOs are configured in one window and 2 CORESETs are configured as shown in FIG. 9($a$). In this case, in one window, the first CORESET may be mapped to the first PDCCH TO, the second CORESET may be mapped to the second PDCCH TO, the first CORESET may be mapped to the third PDCCH TO, the second CORESET may be mapped to the fourth PDCCH TO, the first CORESET may be mapped to the fifth PDCCH TO, and the second CORESET may be mapped to the sixth PDCCH TO.

Alternatively, secondly, by grouping adjacent floor(N/M) or ceil(N/M) TOs in a window, groups and CORESETs may be sequentially mapped in a circular manner. That is, group i may be mapped to CORESET i. As a result, the same CORESET may be mapped to adjacent TOs included in the same group. For example, it is assumed that 6 PDCCH TOs are configured in one window and 2 CORESETs are configured as shown in FIG. 9($b$). In addition, it is assumed that the first to third PDCCH TOs are grouped into a first group, and the fourth to sixth PDCCH TOs are grouped into a second group. In this case, within one window, the first CORESET may be mapped to the first PDCCH TO to the third PDCCH TO (i.e., the first group), and the second CORESET may be mapped to the fourth PDCCH TO to the sixth PDCCH TO (i.e., the second group).

Such a mapping method between TOs and CORESETs may be applied to mapping between TOs and CORESETs within the same window not only in the case of the above-described embodiment 1-4, but also a general case in which the PDCCH is repeatedly transmitted at different times or dividedly transmitted at different times.

As another example, multiple SS sets in one slot may be configured through a higher layer field (e.g., monitoringSymbolsWithinSlot field) defined in an SS set. For example, an SS set is defined/configured with a P slot period, and L SS sets may exist at different times in a slot in which the SS set is configured. In this case, a base station and a UE may agree a window as 1 slot, and a CORESET may be mapped through 'the mapping method between PDCCH TOs and CORESETs within a window' described above.

Alternatively, embodiment 1-4 described above may be configured as a special case of embodiment 1-3. That is, when SS sets 1 and 2 are configured identically in the method of configuring CORESETs 1, 2 and SS sets 1, 2 as in embodiment 1-3, it is not different from embodiment 1-4 in which two CORESETs, one SS set, and two TCIs are configured. Therefore, in this case, the same PDCCH may be repeatedly transmitted in the same manner as in embodiment 1-4.

Embodiment 2

In embodiment 2, a method for dividedly transmitting the same PDCCH by a plurality of base stations (i.e., MTRP) is described.

Hereinafter, in the present disclosure, a plurality of base stations (i.e., MTRP) dividedly transmit the same PDCCH means that when one DCI is transmitted through one PDCCH candidate, TRP 1 transmits in some resources in which the PDCCH candidate is defined and TRP 2 transmits in the remaining resources. One PDCCH candidate dividedly transmitted by a plurality of base stations (i.e., MTRP) may be recognized/indicated to a UE through the following configuration.

It is assumed that the two TRPs operate for convenience of description below, but this assumption does not limit the technical scope of the present disclosure.

Figure 13:
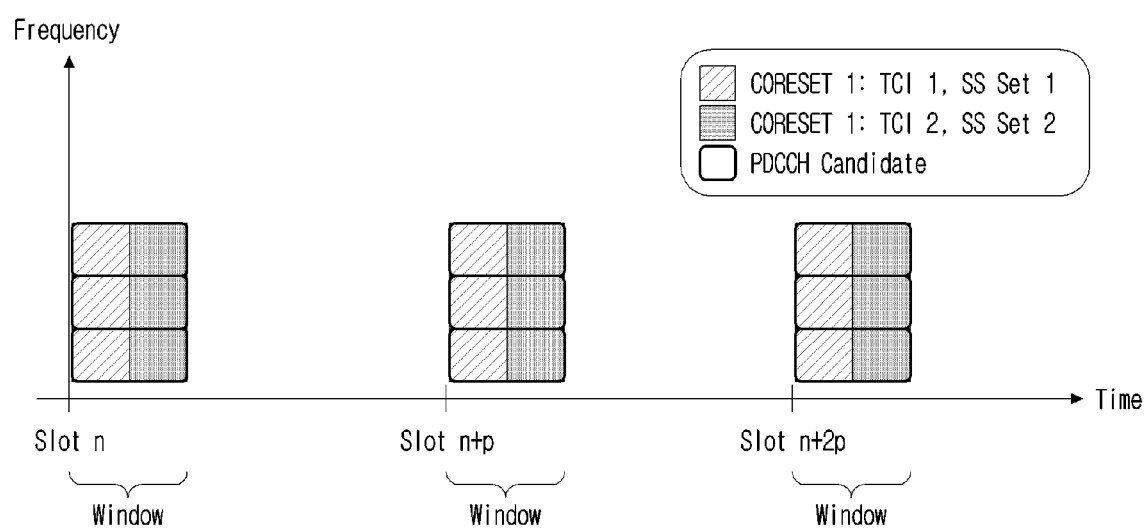
FIG. 13 is a diagram illustrating a method for transmitting and receiving downlink control information according to an embodiment of the present disclosure.

Embodiment 2-1) One PDCCH Candidate Dividedly Transmitted by a Plurality of Base Stations (i.e., MTRP) is Defined/Configured in One (Same) CORESET, but May be Defined/Configured in Different SS Sets FIG. 13 is a diagram illustrating a method for transmitting and receiving downlink control information according to an embodiment of the present disclosure.

Referring to FIG. 13, PDCCH candidate 1 may be transmitted using TCI state 1, and PDCCH candidate 2 may be transmitted using TCI state 2. In addition, PDCCH candidate 1 and PDCCH candidate 2 may be aggregated to configure a single PDCCH candidate through which one DCI is transmitted. In addition, all of the generated PDCCH candidates may be transmitted (repeatedly) at a specific period (P) interval in a time domain.

This method may be configured in a manner similar to that of embodiment 1-1 described above, and one PDCCH candidate may be transmitted/received through different SS sets existing within the same window. For example, a UE may not consider a PDCCH candidate of aggregation level=A1 of SS set 1 and a PDCCH candidate of aggregation level=A2 of SS set 2 within the same window as different PDCCH candidates, and attempt decoding by assuming one PDCCH candidate of aggregation level=A1+A2. Through this method, various aggregation levels other than the existing aggregation level can be supported.

However, since aggregation levels or PDCCH candidates vary in each SS set, a method of generating one candidate from candidates of two SS sets without any restrictions may increase a complexity of UE implementation. To solve this problem, a restriction may be applied to the aggregation of candidates of two SS sets that generate one PDCCH candidate. For example, candidates of two SS sets generating one PDCCH candidate may be restricted to the same aggregation level and/or to the same PDCCH candidate number (or index). Alternatively, for example, one PDCCH candidate may be generated by configuring a reference set (e.g., set 1) among two SS sets, and aggregating a PDCCH candidate of set 1 with a PDCCH candidate of set 2 configured below the aggregation level of the PDCCH candidate of set 1.

Embodiment 2-1 may be configured as a special case of embodiment 2-3. That is, when CORESETs 1 and 2 are configured identically (however, the TCI state and CORESET ID defined in the CORESET are different) in the method of configuring CORESETs 1 and 2 and SS sets 1 and 2 as in embodiment 2-3, it is not different from embodiment 2-1 in which one CORESET, two SS sets, and two TCIs are configured. Therefore, the same PDCCH may be repeatedly transmitted in the same manner as in embodiment 2-1.

Embodiment 2-2) One PDCCH Candidate Dividedly Transmitted by a Plurality of Base Stations (i.e., MTRP) May be Defined/Configured in One (Same) CORESET and One (Same) SS Set A plurality of base stations may dividedly transmit PDCCH candidates defined in one CORESET and one SS set. Here, some of the frequency/time resources constituting one PDCCH candidate are transmitted/received using one of two TCI states set in a CORESET, and the remaining resources may be transmitted/received using the other TCI state.

Figure 14:
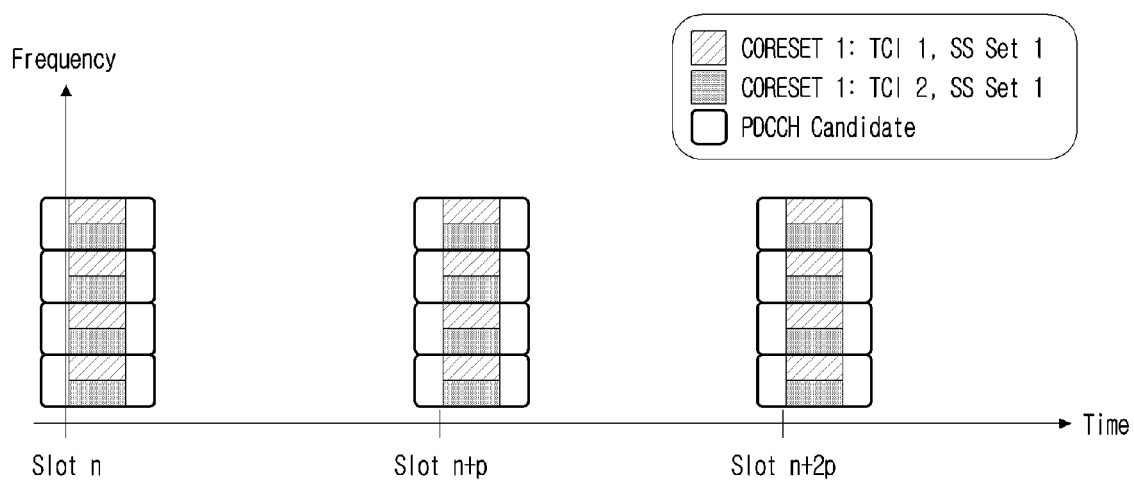
FIG. 14 is a diagram illustrating a method for transmitting and receiving downlink control information according to an embodiment of the present disclosure.

FIG. 14 is a diagram illustrating a method for transmitting and receiving downlink control information according to an embodiment of the present disclosure.

FIG. 14 illustrates an example in which frequency resources constituting one PDCCH candidate are dividedly mapped to different TCI states. All PDCCH candidates may be transmitted (repeatedly) at a specific period (P) interval in a time domain.

For example, frequency resources constituting a PDCCH candidate of aggregation level=4 may be divided into control channel element (CCE) units. In addition, TCI state 1 is mapped to the 1st and 3rd CCEs, and TCI state 2 is mapped to the 2nd and 4th CCEs, so that the TCI state may be mapped alternately. Alternatively, TCI state 1 is mapped to the 1st and 2nd CCEs, and TCI state 2 is mapped to the 3rd and 4th CCEs, so that the CCEs of the previous half and the CCEs of the following half may be mapped to different TCI states. By generalizing this, similarly, for N TCI states, the N TCIs may be mapped one by one as the CCE index increases in a circular manner. Alternatively, all CCEs may be divided into N groups by adjacent CCEs (adjacent CCE indexes), and N CCE groups and N TCI states may be mapped 1:1.

In the case of a PDCCH candidate of aggregation level=1, since it cannot be divided into CCE units, a resource element group (REG: resource element group) bundle size is configured to less than 6 REG, and it may be divided in units of REG bundles. In addition, a TCI state may be mapped by dividing resources in units of REG bundles regardless of an aggregation level. Here, the mapping between TCI states and REG bundles may be equivalently applied to the mapping method between TCI states and CCEs. For example, if a PDCCH candidate with aggregation level=1 is composed of 3 REG bundles (with bundle size=2), TCI state 1 is mapped to the 1st and 3rd REG bundles, and TCI state 2 is mapped to the 2nd REG bundle, so that the TCI state may be mapped alternately. Alternatively, TCI state 1 is mapped to the 1st and 2nd REG bundles, and TCI state 1 is mapped to the 3rd REG bundle, the REG bundles of the previous half and the REG bundles of the following half may be mapped to different TCI states.

Alternatively, in the case of a PDCCH candidate of Aggregation level=1, one TRP transmits one PDCCH candidate, but different TRPs transmit different PDCCH candidates (aggregation level=1), so that a diversity gain can be increased. For example, when there are 4 PDCCH candidates of aggregation level=1, TRP 1 transmits even/odd candidates so that even/odd candidates are mapped to TCI state 1, and TRP 2 conversely transmits odd/even candidates, so odd/even candidates may be mapped to TCI state 2.

According to the current standard, in the case that a wideband DMRS is configured by configuring precoder granularity configured in a CORESET to contiguous RBs (i.e., allContiguousRBs), when estimating a channel for one PDCCH candidate, a UE identifies a REG bundle constituting the PDCCH candidate. In addition, the UE assumes that a DMRS to which the same precoder is applied is transmitted for contiguous frequency resources including the REG bundle in the CORESET. As such, by using not only the REG bundle constituting the PDCCH candidate but also a DMRS of other REGs following the REG bundle, channel estimation accuracy is improved.

However, if the frequency resources constituting one CORESET are mapped to different TCI states as in the present embodiment, the wideband DMRS operation method is no longer valid. This is because some of the contiguous frequency resources including the REG bundle are mapped to TCI state 1 and some are mapped to TCI state 2, so that a channel through which a DMRS is transmitted is different.

Figure 15:
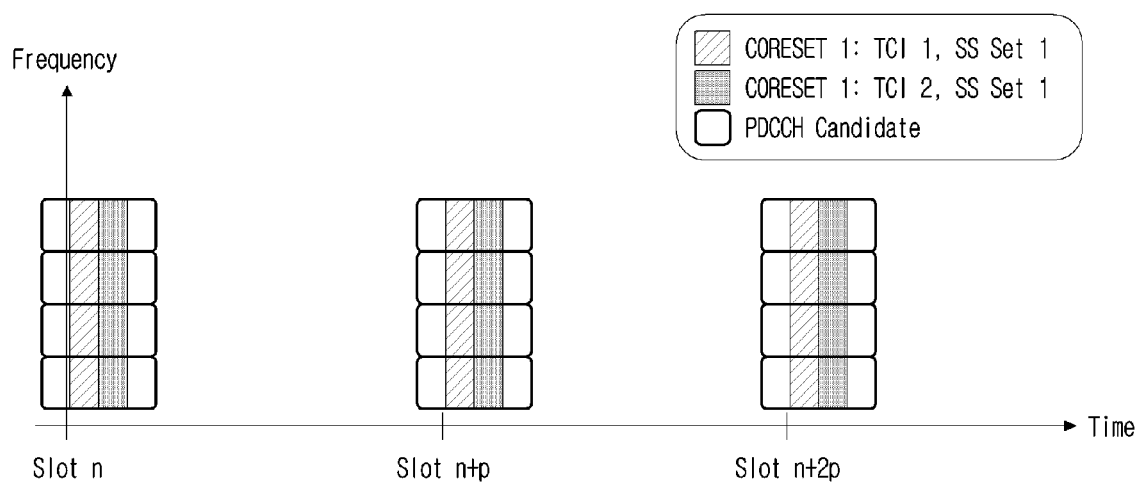
FIG. 15 is a diagram illustrating a method for transmitting and receiving downlink control information according to an embodiment of the present disclosure.

Therefore, in this case, if a wideband DMRS is configured, an operation of a UE should be modified as follows. When estimating a channel for one PDCCH candidate, the UE identifies a REG bundle constituting the PDCCH candidate. In addition, the UE may assume that a DMRS to which the same precoder is applied is transmitted for contiguous frequency resources including the REG bundle among frequency resources to which the same TCI state as the REG bundle is mapped in the CORESET. As shown in FIG. 15, which will be described below, even when a plurality of TRPs dividedly transmit time resources constituting one PDCCH candidate, the UE operation proposed above may be applied when configuring a wideband DMRS. In addition, this method can be extended and applied as it is to the case of the above-described embodiment 1-2. In the case of embodiment 2-4, which will be described below, since one PDCCH candidate is transmitted through two CORESETs, a UE identifies a REG bundle constituting the PDCCH candidate, and may assume that a DMRS to which the same precoder is applied is transmitted for contiguous frequency resources including the REG bundle in a CORESET to which the REG bundle belongs. For example, if a PDCCH candidate consists of 3 REG bundles, when estimating a channel of bundle i (i=1,2,3), a UE may assume that a DMRS to which the same precoder is applied is transmitted for contiguous frequency resources including the bundle in a CORESET to which bundle i belongs.

FIG. 15 is a diagram illustrating a method for transmitting and receiving downlink control information according to an embodiment of the present disclosure.

FIG. 15 illustrates an example in which time resources constituting one PDCCH candidate are dividedly mapped to different TCI states. All PDCCH candidates may be transmitted (repeatedly) at a specific period (P) interval in a time domain.

FIG. 15 is an example in which one CORESET is defined as a CORESET duration of two symbols. In addition, two symbols constituting one PDCCH candidate may be mapped to different TCI states. Here, a mapping between TCIs and symbols may be defined/configured similarly to the above-described mapping method between TCIs and CCEs.

By applying the existing method as it is for the REG, the REG bundle, the mapping between REG bundles and CCEs, resources of a PDCCH candidate may be configured. However, when estimating a channel through an actual DMRS, the existing REG bundle may not be used as it is. This is because symbols constituting the REG bundle are mapped to different TCIs. Therefore, when estimating the channel through the actual DMRS, a UE may reconfigure a REG bundle only with symbols mapped to the same TCI state among symbols constituting the existing REG bundle, and perform channel estimation in units of the reconfigured REG bundle.

In addition, in this method, a window through which the same PDCCH is dividedly transmitted is determined for every transmission occasion (TO) in which the PDCCH is transmitted/received. That is, some of the resources constituting one PDCCH candidate for each PDCCH TO appearing in slot n, n+P, and n+2P are transmitted/received using TCI state 1, and the remaining resources are transmitted/received using TCI state 2. transmitted/received. That is, two TRPs dividedly transmit.

In addition, embodiment 2-2 may be configured as a special case of embodiment 2-3. That is, when CORESETs 1 and 2 are configured identically (however, the TCI state defined in the CORESET are different) and SS sets 1 and 2 are configured identically in the method of configuring CORESETs 1, 2 and SS sets 1, 2 as in embodiment 2-3, it is not different from embodiment 2-2 in which one CORESET, one SS set, and two TCIs are configured. Therefore, the same PDCCH may be dividedly transmitted in the same manner as in embodiment 2-2. Similarly, embodiment 2-2 may be configured as a special case of embodiment 2-4. When CORESETs 1 and 2 are configured identically (however, the TCI state defined in the CORESET are different) in the method of configuring CORESETs 1, 2 and SS set 1 as in embodiment 2-4, it is not different from embodiment 2-2. In addition, embodiment 2-2 may be configured as a special case of embodiment 2-1. That is, when SS 1, 2 are configured identically (however, the TCI state and CORESET ID of the CORESET used in each SS are different) in the method of configuring CORESETs 1 and SS sets 1, 2 as in embodiment 2-1, it is not different from embodiment 2-2 in which one CORESET, one SS set, and two TCIs are configured. Therefore, in this case, the same PDCCH may be repeatedly transmitted in the same manner as in embodiment 2-2.

Figure 16:
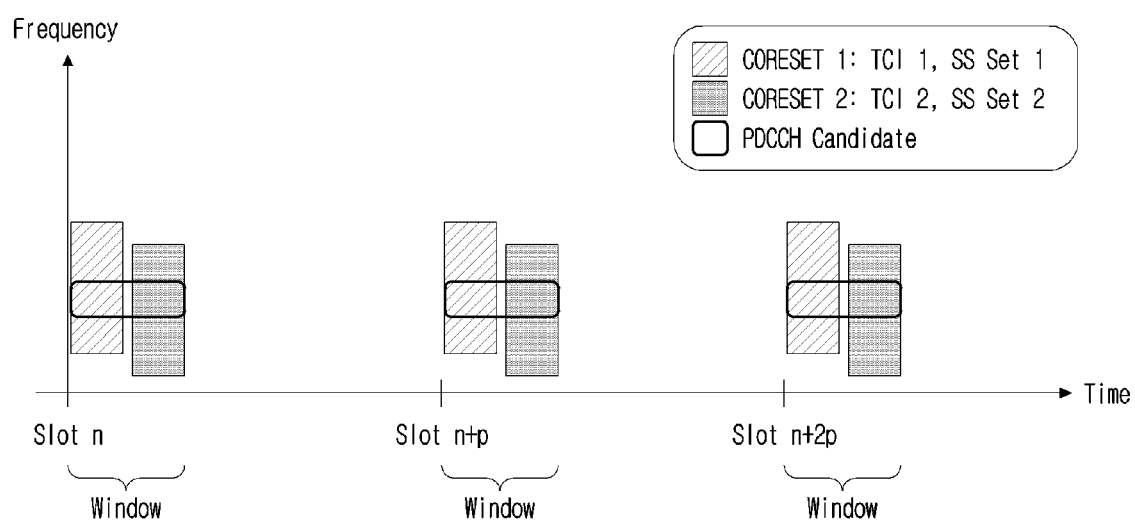
FIG. 16 is a diagram illustrating a method for transmitting and receiving downlink control information according to an embodiment of the present disclosure.

Embodiment 2-3) One PDCCH Candidate Dividedly Transmitted by a Plurality of Base Stations (i.e., MTRP) is Defined/Configured in a Plurality of CORESETs, and May be Defined/Configured in a Plurality of SS Sets FIG. 16 is a diagram illustrating a method for transmitting and receiving downlink control information according to an embodiment of the present disclosure.

FIG. 16, CORESET 1 may be mapped to SS set 1, and CORESET 2 may be mapped to SS set 2. In addition, one PDCCH candidate may be transmitted/received through different SS sets existing within the same window.

For example, a UE may not consider a PDCCH candidate of aggregation level=A1 of SS set 1 and a PDCCH candidate of aggregation level=A2 of SS set 2 within the same window as different PDCCH candidates, and attempt decoding by assuming one PDCCH candidate of aggregation level=A1+A2. Since embodiment 2-3 differs only in a mapping between CORESETs and SS sets compared to embodiment 2-1 described above, the detailed proposal method of proposal 2-1 can be applied as it is.

Here, a base station may indicate a UE that multiple SS sets (e.g., SS sets 1 and 2) are the same group, and a UE may recognize/assume that the SS sets belonging to the same group are configured for dividedly transmitting the same DCI (and/or the same PDCCH candidate).

Figure 17:
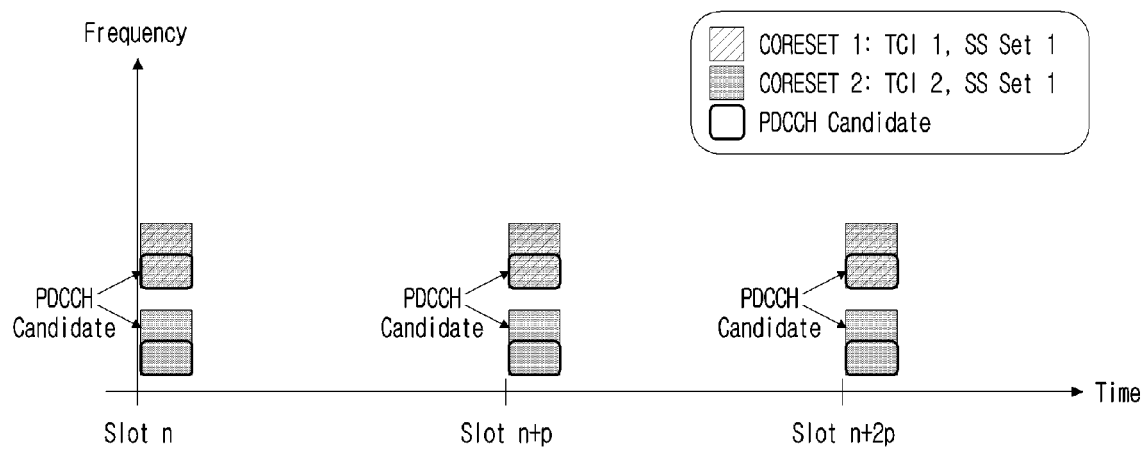
FIG. 17 is a diagram illustrating a method for transmitting and receiving downlink control information according to an embodiment of the present disclosure.

Embodiment 2-4) One PDCCH Candidate Dividedly Transmitted by a Plurality of Base Stations (i.e., MTRP) is Defined/Configured in a Plurality of CORESETs, but May be Defined/Configured in One SS Set FIG. 17 is a diagram illustrating a method for transmitting and receiving downlink control information according to an embodiment of the present disclosure.

Referring to FIG. 17, two CORESETs having different RB resources may be mapped to one SS set. In addition, one PDCCH candidate may be generated by aggregating a PDCCH candidate of CORESET 1 and a PDCCH candidate of CORESET 2. For example, TRP 1 and 2 may transmit PDCCH through CORESET 1 and 2, respectively, and a UE may aggregate the PDCCH candidate of aggregation level=A1 in CORESET 1 and the PDCCH candidate of aggregation level=A2 in CORESET 2 to aggregate aggregation level=A1 and attempt decoding assuming one PDCCH candidate of aggregation level=A1+A2.

However, since aggregation levels or PDCCH candidates vary in each CORESET, a method of generating one candidate from candidates of two CORESETs without any restrictions may increase a complexity of UE implementation. To solve this problem, the aggregation of PDCCH candidates of two CORESETs generating one PDCCH candidate may be restricted. This restriction may be applied similarly to the method of applying a restriction to an aggregation of PDCCH candidates of two SS sets in the above-described embodiment 2-1. That is, since embodiment 2-4 is similar to embodiment 2-1 above, the detailed proposal methods of embodiment 2-1 may be applied. However, in embodiment 2-4, since a single PDCCH is generated by aggregating a plurality of PDCCH candidates multiplexed on frequency resources instead of time resources, it may be modified and applied accordingly.

In addition, in this method, a window through which the same PDCCH is dividedly transmitted is determined for every transmission occasion (TO) in which the PDCCH is transmitted/received. That is, for each PDCCH TO appearing in slot n, n+P, and n+2P, PDCCH candidate 1 is transmitted/received using TCI state 1 (via CORESET 1) in some resources constituting one PDCCH candidate and PDCCH candidate 2 may be transmitted/received using TCI state 2 in remaining resources. That is, two TRPs divide the PDCCH candidate into PDCCH candidate 1 and PDCCH candidate 2 and transmit.

In addition, embodiment 2-4 may be configured as a special case of embodiment 2-3. That is, when SS sets 1 and 2 are configured identically in the method of configuring CORESETs 1 and 2 and SS sets 1 and 2 as in embodiment 2-3, it is not different from embodiment 2-4 in which two CORESETs, one SS sets, and two TCIs are configured. Therefore, the PDCCH may be dividedly transmitted in the same manner as in embodiment 2-4.

In addition, it may be indicated to a UE that with respect to SS set (s) in which a plurality of base stations (i.e., MTRP) dividedly transmit the same PDCCH (that is, in the case of embodiment 2-1 to 2-4 described above), the same PDCCH only for some DCI format/SS type/RNTI defined in an SS set may be dividedly transmitted, and for the rest, it is transmitted from one TRP in the existing method. For example, it may be indicated that only DCI format 1-0 (or 1-1) is dividedly transmitted for an SS set in which both DCI formats 1-0 and 1-1 are defined. Alternatively, it may be indicated that divided transmission is performed only for a common SS (or a UE specific SS) among the UE-specific SS and the common SS. Alternatively, the same PDCCH is dividedly transmitted only for DCI that is CRC masked with a specific RNTI (e.g., RNTIs other than C-RNTI, MCS-C-RNTI, CS-RNTI).

A base station may inform a UE whether a plurality of base stations dividedly transmit the same PDCCH (the case of the above-described embodiment 2) or repeatedly transmit (the case of the above-described embodiment 1) through higher layer signaling.

Hereinafter, the method proposed in the present disclosure can be applied to a case in which a plurality of base stations (i.e., MTRP) repeatedly transmits the same PDCCH (the above-described embodiment 1 case) and a case in which the same PDCCH is dividedly transmitted (the above-described embodiment 2 case).

In the present disclosure, TO (or PDCCH TO) means each channel transmitted at different times when TDM is applied to multiple channels (For example, i) a plurality of PDCCH candidates in the case of repeated transmission, ii) a plurality of aggregated PDCCH candidates or a plurality of PDCCH candidates before being aggregated in the case of divided transmission), and means each channel transmitted at different frequencies/RBs when FDM is applied to multiple channels, and means each channel transmitted at different layers/beams/DMRS ports when SDM is applied to multiple channels. One TCI state may be mapped to each TO.

When the same channel is repeatedly transmitted (e.g., embodiment 1 case), complete DCI/data/uplink control information (UCI) is transmitted in one TO, and a receiver can increase a reception success rate by receiving multiple TOs. When one channel is divided into multiple TOs and transmitted (e.g., embodiment 2 case), a part of DCI/data/UCI is transmitted in one TO, and a receiver should receive all multiple TOs to collect the fragmented DCI/data/UCI and receive the complete DCI/data/UCI.

A control resource set (i.e., CORESET: ControlResourceSet) may be configured through higher layer signaling (e.g., RRC).

Table 6 illustrates a CORESET configuration (i.e., ControlResourceSet information element (IE)).

The IE ControlResourceSet is used to configure a time/frequency control resource set (CORESET) in which to search for downlink control information.

TABLE 6

-- ASN1START
-- TAG-CONTROLRESOURCESET-START
ControlResourceSet ::=      SEQUENCE {

TABLE 6-continued

```
controlResourceSetId              ControlResourceSetId,
frequencyDomainResources             BIT STRING (SIZE (45) ),
duration                          INTEGER (1..maxCoReSetDuration),
cce-REG-MappingType               CHOICE {
    interleaved                       SEQUENCE {
        reg-BundleSize                    ENUMERATED {n2, n3, n6},
        interleaverSize                   ENUMERATED {n2, n3, n6},
        shiftIndex                        INTEGER(0..maxNrofPhysicalResourceBlocks-1)
OPTIONAL -- Need S
    },
    nonInterleaved                NULL
},
precoderGranularity               ENUMERATED {sameAsREG-bundle, allContiguousRBs},
tci-StatesPDCCH-ToAddList         SEQUENCE(SIZE (1..maxNrofTCI-StatesPDCCH)) OF TCI-
StateId OPTIONAL, -- Cond NotSIB1-initialBWP
tci-StatesPDCCH-ToReleaseList     SEQUENCE(SIZE (1..maxNrofTCI-StatesPDCCH)) OF TCI-
StateId OPTIONAL, -- Cond NotSIB1-initialBWP
tci-PresentInDCI                  ENUMERATED {enabled}
OPTIONAL, -- Need S
pdcch-DMRS-ScramblingID           INTEGER (0..65535)
OPTIONAL, -- Need S
...,
[[
rb-Offset-r16                     INTEGER (0..5)
OPTIONAL, -- Need N
tci-PresentInDCI-ForDCI-Format1-2-r16 INTEGER (1..3)
OPTIONAL, -- Need S
coresetPoolIndex-r16              INTEGER (0..1)
OPTIONAL, -- Need R
controlResourceSetId-r16          ControlResourceSetId-r16
OPTIONAL -- Need S
]]
}
-- TAG-CONTROLRESOURCESET-STOP
-- ASN1STOP
```

Table 7 shows a description of each parameter in Table 6.

TABLE 7

ControlResourceSet field descriptions cce-REG-MappingType

Mapping of Control Channel Elements (CCE) to Resource Element Groups (REG)
controlResourceSetId Identifies the instance of the ControlResourceSet IE. Value 0 identifies the common CORESET configured in MIB and in ServingCellConfigCommon (controlResourceSetZero) and is hence not used here in the ControlResourceSet IE. Other values identify CORESETs configured by dedicated signalling or in SIB1. The controlResourceSetId is unique among the BWPs of a serving cell.
If the field controlResourceSetId-r16 is present, the UE shall ignore the controlResourceSetId field (without suffix).
coresetPoolIndex The index of the CORESET pool for this CORESET. If the field is absent, the UE applies the value 0.
duration Contiguous time duration of the CORESET in number of symbols
frequencyDomainResources Frequency domain resources for the CORESET. Each bit corresponds a group of 6 RBs, with grouping starting from the first RB group in the BWP.
The first (left-most/most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part (BWP) within which the CORESET is configured are set to zero TABLE 7-continued ControlResourceSet field descriptions interleaverSize Interleaver-size
pdcch-DMRS-ScramblingID PDCCH DMRS scrambling initialization. When the field is absent the UE applies the value of the physCellId configured for this serving cell.
precoderGranularity Precoder granularity in frequency domain
rb-Offset Indicates the RB level offset in units of RB from the first RB of the first 6 RB group to the first RB of BWP. When the field is absent, the UE applies the value 0.
reg-BundleSize Resource Element Groups (REGs) can be bundled to create REG bundles. This parameter defines the size of such bundles.
shiftIndex When the field is absent the UE applies the value of the physCellIdconfigured for this serving cell.
tci-PresentInDCI This field indicates if TCI field is present or absent in DCI format 1_1. When the field is absent, the UE considers the TCI to be absent/disabled. In case of cross carrier scheduling, the network sets this field to enabled for the ControlResourceSet used for cross carrier scheduling in the scheduling cell.

TABLE 7-continued

ControlResourceSet field descriptions tci-PresentInDCI-ForDCI-Format1-2

Configures the number of bits for "Transmission configuration indicator" in DCI format 1_2. When the field is absent the UE applies the value of 0 bit for the "Transmission configuration indicator" in DCI format 1_2.
tci-StatesPDCCH-ToAddList A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports. The network configures at most maxNrofTCI-StatesPDCCH entries.

Table 8 illustrates information signaled for ControlResourceSet.

TABLE 8

For each CORESET, the UE is provided the following by ControlResourceSet:
- a CORESET index p, by controlResourceSetId, where
  - 0 < p < 12 if coresetPoolIndex is not provided, or if a value of coresetPoolIndex is same for all CORESETs if coresetPoolIndex is provided;
  - 0 < p < 16 if coresetPoolIndex is not provided for a first CORESET, or is provided and has a value 0 for a first CORESET, and is provided and has a value 1 for a second CORESET;

TABLE 8-continued

- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomainResources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
  - if the UE is provided by simultaneousTCI-UpdateList lists of cells for simultaneous TCI state activation, the UE applies the antenna port quasi co-location provided by TCI-States with same activated tci-StateID value to CORESETs with index RR in all configured DL BWPs of all configured cells in a list determined from a serving cell index provided by a MAC CE command.
  - an indication for a presence or absence of a TCI field for a DCI format, other than DCI format 1_0, that schedules PDSCH receptions or indicates SPS PDSCH release, by tci-PresentInDCI or tci-PresentDCI-1-2.

A search space (SS) may be configured through higher layer signaling (e.g., RRC). Table 9 illustrates a search space configuration (i.e., SearchSpace IE).

The IE SearchSpace defines how/where to search for PDCCH candidates. Each search space is associated with one ControlResourceSet. For a scheduled cell in the case of cross carrier scheduling, except for nrofCandidates, all the optional fields are absent.

TABLE 9

```
-- ASN1START
-- TAG-SEARCHSPACE-START
SearchSpace ::=                            SEQUENCE {
    searchSpaceId                              SearchSpaceId,
    controlResourceSetId                       ControlResourceSetId
                                               OPTIONAL, -- Cond SetupOnly
    monitoringSlotPeriodicityAndOffset         CHOICE {
        sl1                                        NULL,
        sl2                                        INTEGER (0..1),
        sl4                                        INTEGER (0..3),
        sl5                                        INTEGER (0..4),
        sl8                                        INTEGER (0..7),
        sl10                                       INTEGER (0..9),
        sl16                                       INTEGER (0..15),
        sl20                                       INTEGER (0..19),
        sl40                                       INTEGER (0..39),
        sl80                                       INTEGER (0..79),
        sl160                                      INTEGER (0..159),
        sl320                                      INTEGER (0..319),
        sl640                                      INTEGER (0..639),
        sl1280                                     INTEGER (0..1279),
        sl2560                                     INTEGER (0..2559)
    }
                                               OPTIONAL, -- Cond Setup
    duration                                   INTEGER (2..2559)
                                               OPTIONAL, -- Need R
    monitoringSymbolsWithinSlot                BIT STRING (SIZE (14))
                                               OPTIONAL, -- Cond Setup
    nrofCandidates                             SEQUENCE {
        aggregationLevel1                          ENUMERATED {n0, n1, n2, n3, n4, n5, n6, n8},
        aggregationLevel2                          ENUMERATED {n0, n1, n2, n3, n4, n5, n6, n8},
        aggregationLevel4                          ENUMERATED {n0, n1, n2, n3, n4, n5, n6, n8},
        aggregationLevel8                          ENUMERATED {n0, n1, n2, n3, n4, n5, n6, n8},
        aggregationLevel16                         ENUMERATED {n0, n1, n2, n3, n4, n5, n6, n8}
    }
                                               OPTIONAL, -- Cond Setup
    searchSpaceType                            CHOICE {
        common                                     SEQUENCE {
            dci-Format0-0-AndFormat1-0                 SEQUENCE {
            ...
```

TABLE 9-continued

```
            }                                                   OPTIONAL, -- Need R
        dci-Format2-0                       SEQUENCE {
            nrofCandidates-SFI                  SEQUENCE {
                aggregationLevel1                   ENUMERATED {n1, n2}
OPTIONAL, -- Need R
                aggregationLevel2                   ENUMERATED {n1, n2}
OPTIONAL, -- Need R
                aggregationLevel4                   ENUMERATED {n1, n2}
OPTIONAL, -- Need R
                aggregationLevel8                   ENUMERATED {n1, n2}
OPTIONAL, -- Need R
                aggregationLevel16                  ENUMERATED {n1, n2}
OPTIONAL -- Need R
            },
            ...
        }
OPTIONAL, -- Need R
        dci-Format2-1                       SEQUENCE {
            ...
        }
OPTIONAL, -- Need R
        dci-Format2-2                       SEQUENCE {
            ...
        }
OPTIONAL, -- Need R
        dci-Format2-3                       SEQUENCE {
            dummy1                              ENUMERATED {s11, s12, s14, s15, s18, s110,
s116, s120} OPTIONAL, -- Cond Setup
            dummy2                              ENUMERATED {n1, n2},
            ...
        }
OPTIONAL -- Need R
        },
        ue-Specific                         SEQUENCE {
            dci-Formats                         ENUMERATED {formats 0-0-And-1-0, formats0-1-
And-1-1),
            ...,
            [[
            dci-FormatsSL-r16                   ENUMERATED {formats 0-0-And-1-0, formats0-1-And-
1-1, formats3-0, formats3-1,
                                                formats3-0-And-3-1}
OPTIONAL, -- Need R
            dci-FormatsExt-r16                  ENUMERATED {formats0-1-And-1-1, formats0-2-And-
1-2, formats0-1-And-1-1And-0-2-And-1-2}
OPTIONAL, -- Need N
            searchSpaceGroupIdList-r16          SEQUENCE (SIZE (1..2)) OF INTEGER (0..1)
OPTIONAL, -- Need R
            freqMonitorLocations-r16            BIT STRING (SIZE (5))
OPTIONAL -- Need R
            ]]
        }
    }
OPTIONAL -- Cond Setup2
}
SearchSpace-v16xy ::=          SEQUENCE {
    searchSpaceId                  SearchSpaceId,
    controlResourceSetId-r16       ControlResourceSetId-r16
OPTIONAL, -- Cond SetupOnly
    searchSpaceType-r16            CHOICE {
        common-r16                     SEQUENCE {
            dci-Format2-4-r16                   SEQUENCE {
                nrofCandidates-CI-r16               SEQUENCE {
                    aggregationLevel1                   ENUMERATED {n1, n2}
OPTIONAL, -- Need R
                    aggregationLevel2                   ENUMERATED {n1, n2}
OPTIONAL, -- Need R
                    aggregationLevel4                   ENUMERATED {n1, n2}
OPTIONAL, -- Need R
                    aggregationLevel8                   ENUMERATED {n1, n2}
OPTIONAL, -- Need R
                    aggregationLevel16                  ENUMERATED {n1, n2}
OPTIONAL -- Need R
                },
                ...
            },
            dci-Format2-5-v16xy                 SEQUENCE {
                nrofCandidates-IAB-r16              SEQUENCE {
                    aggregationLevel1-r16               ENUMERATED {n1, n2}
OPTIONAL, -- Need R
```

TABLE 9-continued

```
        aggregationLevel2-r16           ENUMERATED {n1, n2}
OPTIONAL, -- Need R
        aggregationLevel4-r16           ENUMERATED {n1, n2}
OPTIONAL, -- Need R
        aggregationLevel8-r16           ENUMERATED {n1, n2}
OPTIONAL, -- Need R
        aggregationLevel16-r16          ENUMERATED {n1, n2}
OPTIONAL -- Need R
    },
    ...
    },
    dci-Format2-6-r16                   SEQUENCE {
    ...
    }
OPTIONAL, -- Need R
    ...
    },
    mt-Specific-v16xy                   SEQUENCE {
        dci-Formats-r16                 ENUMERATED {formats2-0-And-2-5} ,
    ...
    }
}
OPTIONAL -- Cond Setup2
}
-- TAG-SEARCHSPACE-STOP
-- ASN1STOP
```

Table 10 shows a description of each parameter in Table 9.

TABLE 1

| SearchSpace field description |
|---|
| common |
| Configures this search space as common search space (CSS) and DCI formats to monitor. |
| controlResourceSetId |
| The CORESET applicable for this SearchSpace. Value 0 identifies the common CORESET#0 configured in MIB and in ServingCellConfigCommon. Values 1..maxNrofControlResourceSets-1 identify CORESETs configured in System Information or by dedicated signalling. The CORESETs with non-zero controlResourceSetId are configured in the same BWP as this SearchSpace. If the field controlResourceSetId-r16 is present, UE shall ignore the controlResourceSetId (without suffix). |
| dummy1, dummy2 |
| This field is not used in the specification. If received it shall be ignored by the UE. |
| dci-Format0-0-AndFormat1-0 |
| If configured, the UE monitors the DCI formats 0_0 and 1_0. |
| dci-Format2-0 |
| If configured, UE monitors the DCI format 2_0. |
| dci-Format2-1 |
| If configured, UE monitors the DCI format 2_1. |
| dci-Format2-2 |
| If configured, UE monitors the DCI format 2_2. |
| dci-Format2-3 |
| If configured, UE monitors the DCI format 2_3. |
| dci-Format2-4 |
| If configured, UE monitors the DCI format 2_4. The maximum monitoring periodicity for DCI format 2_4 is 5 slots. |
| dci-Format2-5 |
| If configured, Integrated Access and Backhaul (IAB)-Mobile Termination (MT) monitors the DCI format 2_5. |

TABLE 1-continued

| SearchSpace field description |
|---|
| dci-Format2-6 |
| If configured, UE monitors the DCI format 2_6. DCI format 2_6 can only be configured on the SpCell. |
| dci-Formats |
| Indicates whether the UE monitors in this USS for DCI formats 0-0 and 1-0 or for formats 0-1 and 1-1. |
| dci-FormatsExt |
| If this field is present, the field dci-Formats is ignored and dci-FormatsExt is used instead to indicate whether the UE monitors in this USS for DCI formats 0_1 and 1_1 or format 0_2 and 1_2 or formats 0_1 and 1_1 and 0_2 and 1_2. |
| dci-FormatsSL |
| Indicates whether the UE monitors in this USS for DCI formats 0-0 and 1-0 or for formats 0-1 and 1-1 or for format 3-0 of dynamic grant or for format 3-1 or for formats 3-0 of dynamic grant and 3-1. |
| duration |
| Number of consecutive slots that a SearchSpace lasts in every occasion, i.e., upon every period as given in the periodicityAndOffset. If the field is absent, the UE applies the value 1 slot, except for DCI format 2_0. The UE ignores this field for DCI format 2_0. The maximum valid duration is periodicity-1 (periodicity as given in the monitoringSlotPeriodicityAndOffset). For IAB-MT, duration indicates number of consecutive slots that a SearchSpace lasts in every occasion, i.e., upon every period as given in the periodicityAndOffset. If the field is absent, the IAB-MT applies the value 1 slot, except for DCI format 2_0 and DCI format 2_5. The UE ignores this field for DCI format 2_0 and DCI format 2_5. The maximum valid duration is periodicity-1 (periodicity as given in the monitoringSlotPeriodicityAndOffset). |
| freqMonitorLocations |
| 1 implies a frequency domain resource allocation replicated from the pattern configured in the associated CORESET is mapped to the RB set. Least significant bit (LSB) corresponds to lowest RB set in the BWP. For a RB set indicated in the bitmap, the first PRB of the frequency domain monitoring location confined within the RB set is aligned with {the first PRB of the RB set + rb-Offset provided by the associated CORESET. |

TABLE 1-continued

SearchSpace field description monitoringSlotPeriodicityAndOffset

Slots for PDCCH Monitoring configured as periodicity and offset. If the UE is configured to monitor DCI format 2_1, only the values 's11', 's12' or 's14' are applicable. If the UE is configured to monitor DCI format 2_0, only the values 's11', 's12', 's14', 's15', 's18', 's110', 's116', and 's120' are applicable.
For IAB-MT, If the IAB-MT is configured to monitor DCI format 2_1, only the values 's11', 's12' or 's14' are applicable. If the IAB-MT is configured to monitor DCI format 2_0 or DCI format 2_5, only the values 's11', 's12', 's14', 's15', 's18', 's110', 's116', and 's120' are applicable.

monitoringSymbolsWithinSlot

The first symbol(s) for PDCCH monitoring in the slots configured for PDCCH monitoring (see monitoringSlotPeriodicityAndOffset and duration) . The most significant (left) bit represents the first OFDM in a slot, and the second most significant (left) bit represents the second OFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE.
For DCI format 2_0, the first one symbol applies if the duration of CORESET (in the IE ControlResourceSet) identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

nrofCandidates-CI

The number of PDCCH candidates specifically for format 2-4 for the configured aggregation level. If an aggregation level is absent, the UE does not search for any candidates with that aggregation level. The network configures only one aggregationLevel and the corresponding number of candidates.

nrofCandidates-SFI

The number of PDCCH candidates specifically for format 2-0 for the configured aggregation level. If an aggregation level is absent, the UE does not search for any candidates with that aggregation level. The network configures only one aggregationLevel and the corresponding number of candidates.

nrofCandidates

Number of PDCCH candidates per aggregation level. The number of candidates and aggregation levels configured here applies to all formats unless a particular value is specified or a format-specific value is provided (see inside searchSpaceType). If configured in the SearchSpace of a cross carrier scheduled cell, this field determines the number of candidates and aggregation levels to be used on the linked scheduling cell.

searchSpaceGroupIdList

List of search space group IDs which the search space set is associated with searchSpaceId

Identity of the search space. SearchSpaceId = 0 identifies the searchSpaceZero configured via PBCH (MIB) or ServingCellConfigCommon and may hence not be used in the SearchSpace IE. The searchSpaceId is unique among the BWPs of a Serving Cell. In case of cross carrier scheduling, search spaces with the same searchSpaceId in scheduled cell and scheduling cell are linked to each other. The UE applies the search space for the scheduled cell only if the DL BWPs in which the linked search spaces are configured in scheduling cell and scheduled cell are both active.

TABLE 1-continued

SearchSpace field description

For an IAB-MT, the search space defines how/where to search for PDCCH candidates for an IAB-MT. Each search space is associated with one ControlResearchSet. For a scheduled cell in the case of cross carrier scheduling, except for nrofCandidates, all the optional fields are absent.

searchSpaceType

Indicates whether this is a common search space (present) or a UE specific search space as well as DCI formats to monitor for.

ue-Specific

Configures this search space as UE specific search space (USS). The UE monitors the DCI format with CRC scrambled by C-RNTI, CS-RNTI (if configured), and SP-CSI-RNTI (if configured).

mt-Specific-vl6xy

Configure this search space as IAB-MT specific search space (MSS).

The contents of Tables 6 to 10 described above may be used to apply/configure the methods proposed in the present disclosure.

Embodiment 3) Determination Method of MTRP PDCCH Transmission Scheme According to CORESET and SS Configuration Conditions A base station may configure two CORESETs and two SSs for MTRP PDCCH transmission to a UE, and a method in which a MTRP PDCCH transmission scheme is determined according to configuration conditions of the two CORESETs and the two SSs is proposed.

For example, when the frequency resource regions of the two CORESETs set are the same and/or when the two set CORESETs have the same parameter settings except for the TCI state and CORESET ID (e.g., ControlResourceSet IE in Table 6) refer), a method in which the same DCI is TDMed at different times and repeatedly transmitted as in Example 1-1 may be applied.

Alternatively, for example, when time domain resources of configured 2 SSs are the same and/or configurations of remaining parameters are the same except for a mapped CORESET and a SS ID among configured parameters of the configured 2 SSs (for example, refer to the searchspace IE of Table 9), a scheme in which the same DCI is FDMed to different frequencies and repeatedly transmitted as in embodiment 1-4 may be applied.

Alternatively, for example, when configurations of remaining parameters are the same except for a TCI state and a CORESET ID of configured 2 CORESETs (for example, refer to the ControlResourceSet IE in Table 6), and configurations of remaining parameters are the same except for a mapped CORESET and a SS ID among configured parameters of the configured 2 SSs (for example, refer to the searchspace IE in Table 9), a method in which 2 TRPs dividedly transmit the same DCI by in different frequencies/CCEs/REGs/REs may be applied as in the previous embodiment 2-2. Alternatively, when configurations of remaining parameters are the same except for a TCI state and a CORESET ID of configured 2 CORESETs (for example, refer to the ControlResourceSet IE in Table 6), and configurations of remaining parameters are the same except for a mapped CORESET and a SS ID among configured parameters of the configured 2 SSs (for example, refer to the searchspace IE in Table 9), two TRPs may transmit a PDCCH in a single frequency network (SFN) scheme using the same PDCCH DMRS port in the same frequency/time resource region. Alternatively, when configurations of remaining parameters are the same except for a TCI state and a CORESET ID of configured 2 CORESETs (for example, refer to the ControlResourceSet IE in Table 6), and configurations of remaining parameters are the same except for a mapped CORESET and a SS ID among configured parameters of the configured 2 SSs (for example, refer to the searchspace IE in Table 9), the method in which the same DCI is FDMed in different frequencies and repeatedly transmitted as in embodiment 1-2 may be applied.

When a configuration of two CORESETs and two SSs satisfies the specific conditions described above, if a plurality of MTRP PDCCH transmission schemes are applicable, a base station may indicate to a UE which transmission scheme to apply though higher layer signaling (e.g., RRC signaling).

Alternatively, a base station may configure one CORESET and two SSs for MTRP PDCCH transmission to a UE, and a MTRP PDCCH transmission scheme may be determined according to a configuration condition of the one CORESET and two SSs.

For example, when configurations of remaining parameters are the same except for a mapped CORESET and a SS ID among configured parameters of the configured 2 SSs (for example, refer to the searchspace IE in Table 9), a method in which 2 TRPs dividedly transmit the same DCI by in different frequencies/CCEs/REGs/REs may be applied as in the previous embodiment 2-2. Alternatively, when configurations of remaining parameters are the same except for a mapped CORESET and a SS ID among configured parameters of the configured 2 SSs (for example, refer to the searchspace IE in Table 9), two TRPs may transmit a PDCCH in a single frequency network (SFN) scheme using the same PDCCH DMRS port in the same frequency/time resource region. Alternatively, when configurations of remaining parameters are the same except for a mapped CORESET and a SS ID among configured parameters of the configured 2 SSs (for example, refer to the searchspace IE in Table 9), the method in which the same DCI is FDMed in different frequencies and repeatedly transmitted as in embodiment 1-2 may be applied. When the above-described SS conditions are not satisfied, a method in which the same DCI is TDMed at different times and repeatedly transmitted as in Embodiment 1-1 may be applied.

When a configuration of one CORESET and two SSs satisfies the specific condition described above, if a plurality of MTRP PDCCH transmission schemes are applicable, a base station may indicate to a UE which transmission scheme to apply though higher layer signaling (e.g., RRC signaling).

Alternatively, a base station configures two CORESETs and one SS for MTRP PDCCH transmission to a UE, and a MTRP PDCCH transmission scheme may be determined according to a configuration condition of the two CORESETs and one SS.

For example, when configurations of remaining parameters are the same except for a TCI state and a CORESET ID of configured 2 CORESETs (for example, refer to the ControlResourceSet IE in Table 6), a method in which 2 TRPs dividedly transmit the same DCI by in different frequencies/CCEs/REGs/REs may be applied as in the previous embodiment 2-2. Alternatively, when configurations of remaining parameters are the same except for a TCI state and a CORESET ID of configured 2 CORESETs (for example, refer to the ControlResourceSet IE in Table 6), two TRPs may transmit a PDCCH in a single frequency network (SFN) scheme using the same PDCCH DMRS port in the same frequency/time resource region. Alternatively, when configurations of remaining parameters are the same except for a TCI state and a CORESET ID of configured 2 CORESETs (for example, refer to the ControlResourceSet IE in Table 6), the method in which the same DCI is FDMed in different frequencies and repeatedly transmitted as in embodiment 1-2 may be applied.

When a configuration of two CORESETs and one SS satisfies the specific condition described above, if a plurality of MTRP PDCCH transmission schemes are applicable, a base station may indicate to a UE which transmission scheme to apply though higher layer signaling (e.g., RRC signaling).

For two search spaces configured to repeatedly transmit the same PDCCH (embodiment 1 above) or to dividedly transmit (embodiment 2 above), a DCI format to be blind decoded in each search space may be configured independently. For example, DCI format 1-0/1-1 may be configured in search space 0, and DCI format 1-2/1-1 may be configured in search space 1. In this case, multiple TRPs can be repeatedly transmitted or dividedly transmitted only for the common DCI format (e.g., DCI format 1-1 in the above example) of the two search spaces, and only one TRP can be transmitted for other DCI formats.

Embodiment 4) CORESET Configuration Method for MTRP PDCCH Transmission of CORESET 0

In order for two TRPs to transmit the same PDCCH, a QCL RS of a PDCCH DMRS transmitted by each TRP should be different, and as a result, a TCI state to be used for PDCCH decoding should be different. In the conventional method, one TCI state is defined per CORESET. However, for MTRP PDCCH transmission, two CORESETs corresponding to TCI states of two TRPs may be configured, or one CORESET may be configured and two TCI states may be configured in the CORESET.

According to the existing standard, CORESET 0 is a special CORESET used to transmit system information to a UE, unlike a general CORESET. When two CORESETs are configured for MTRP PDCCH transmission, other UE operations based on CORESET 0 may become ambiguous. Therefore, in the case of CORESET 0, up to two TCI states may be configured to support MTRP PDCCH transmission. For the remaining CORESETs, one TCI state may be configured per CORESET, and multiple CORESETs may be used to support MTRP PDCCH transmission. Alternatively, if one TCI state is still configured in CORESET 0, and the other CORESET (e.g., CORESET x) has the same configurations as CORESET 0, except for a TCI state and a CORESET ID, a UE may use CORESET x for configuring an additional TCI state to CORESET 0.

When a plurality of TCI states are configured in a CORESET and/or CORESETs/SSs having different TCIs (setting parameters) are overlapped, a base station may separately indicate/configure a type of SS (for example, USS only/USS+CSS/some RNTI only among USS+CSS/CSS only, etc.) to be applied.

In the case of CSS, various types of information may be transmitted in detail. For example, system information transmitted with SI-RNTI (system information-RNTI), paging, or a PDCCH transmitted with RA-RNTI (random access-RNTI) and t-C-RNTI (Temporary Cell-RNTI) during initial access, etc. may be included. Since the initial access-related PDCCH is transmitted before RRC connection, it is preferable that the initial access-related PDCCH is transmitted from a specific TRP transmitting a synchronization signal block (SSB) to which a UE attempts to access. Since paging and system information (SI) have broadcasting properties, it can already be considered that multiple beams/TRP are being transmitted in the current standard. For example, several TRPs are transmitting the same paging information to a UE in an idle state, respectively, and the UE may wake up by receiving one of the pagings. When the same DCI is repeatedly transmitted by different TRPs, when a UE determines that each DCI is an individual DCI and succeeds in receiving at least one of a plurality of DCIs, the UE can receive the corresponding control information, so reliability can be improved. In addition, redesign of a PBCH in a SSB is required for MTRP transmission for SI-PDCCH. As such, for CORESET 0, MTRP transmission itself may not be supported at all, or MTRP transmission may be limitedly applied only to a USS. For this purpose, when a plurality of TCI states are configured/applied to CORESET 0, only the first TCI (for example, the TCI state having the lowest ID or the TCI state that appears first among TCI states configured in a CORESET) may be applied to a CSS, both TCI states may be applied to a USS. Alternatively, when a plurality of TCI states are configured/applied to a CORESET, if the corresponding CORESET is used in associated with a CSS, only the first TCI among the plurality of TCIs may be applied, and both TCI states may be applied to a USS. Alternatively, when a plurality of TCI states are configured/applied to a CORESET, if the CORESET is used in associated with DCI format x-0 (e.g., 1-0 or 0-0), only the first TCI state among the plurality of TCI states may be applied, and both TCI states may be applied to DCI format x-1 or x-2 (e.g., 1-1 or 0-1).

In the above-described proposed methods, the following method may be applied as a specific signaling method for configuring a configuration parameter set overlapping a plurality of CORESETs/SSs. For example, it may be repeatedly indicated/configured values for each parameter in each parameter set. Alternatively, an indicator indicating overlap with other CORESET/SS for a specifically defined parameter set may be added. (For example, overlapping indicator 1 bit+overlapped CORESET/SS ID) RRC overhead can be reduced through this method.

Embodiment 5

According to the current standard, a UE reports the maximum number x of CORESETs that can be configured in one BWP and one serving cell to a base station as a capability. When two TCI states are configured in one CORESET as in the previously proposed method, the corresponding CORESET is not counted the same as the existing CORESET in which one TCI state is configured, but may be counted differently.

For example, for COREST in which two TCI states are configured, since a UE should track two DL beams for the corresponding CORESET, the complexity for a UE is required twice higher than the existing CORESET for beam management (BM). Therefore, it is desirable to count the corresponding CORESET as two CORESETs. Alternatively, double complexity occurs for BM, but except for the DL beam, the remaining configuration methods such as frequency domain configuration and OFDM symbol number configuration are the same as the existing CORESET, so it is not counted as two, and it may be counted as a value greater than 1 and less than 2 (for example, 1.5).

Accordingly, if a UE reports x=3 to a base station, the maximum number of cases in which the UE can be configured is as follows.
 one existing CORESET and one CORESET in which two TCI states are configured (e.g., the corresponding CORESET is counted as two) may be configured; or
 three existing CORESETs may be configured; or
 one COREST in which two TCI states are configured may be configured.

Alternatively, a UE reports the maximum number (y) of COREST in which two TCI states are configured and the maximum number (x) of COREST in which one TCI state is configured as a capability separately to a base station, and the UE may expect to be configured a CORESET so as not to exceed the maximum number for each. Additionally, the maximum value z of the sum of the number of CORESTs in which two TCI states are configured and the number of CORETs in which one TCI state is configured may be reported to a base station as capability. A base station may configure a COREST in which two TCI states are configured not to exceed y, a COREST in which one TCI state is configured not to exceed x, and the sum of the COREST in which two TCI states are configured and the CORESET in which one TCI state is configured not to exceed z. Alternatively, a UE may more simply report z only to a base station without x and y, and the base station may configure a CORESET using only z.

Figure 18:
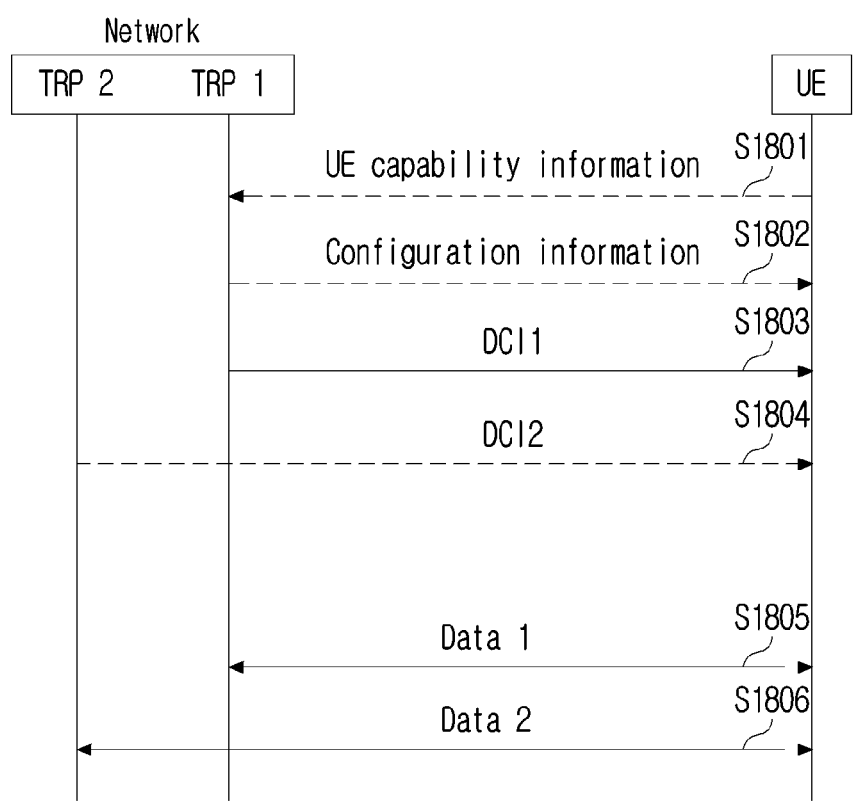
FIG. 18 illustrates a signaling method between a terminal and a network according to an embodiment of the present disclosure.

FIG. 18 illustrates a signaling method between a terminal and a network according to an embodiment of the present disclosure.

FIG. 18 represents an example of signaling between a network side (e.g., TRP 1, TRP 2) and a UE in a situation of multiple TRP (that is, M-TRP or multiple cells, all TRPs in the present disclosure may be replaced with cells) to which the above-described embodiments (embodiments 1 to 5) may be applied. Here, the UE/network is just one example and may be implemented in various devices.

In addition, FIG. 18 is only for convenience of description, and does not limit the scope of the present disclosure. In addition, some of the step(s) illustrated in FIG. 18 may be omitted depending on circumstances and/or configurations.

Referring to FIG. 18, signaling between two TRPs and a UE is exemplified for convenience of description, but of course, the signaling method may be extended and applied to signaling between multiple TRPs and multiple UEs. In the following description, the network side may be one base station including a plurality of TRPs, and may be one cell including a plurality of TRPs. In an example, ideal/non-ideal backhaul may be configured between TRP 1 and TRP 2 included in the Network side. In addition, the following description is described based on a plurality of TRPs, but it may be also equivalently extended and applied to transmission through a plurality of panels, and in this case, the TRP is replaced with a panel so that the operations of the present disclosure may be interpreted. In the present disclosure, an operation in which a terminal receives a signal from TRP1/TRP2 may be interpreted/described as an operation in which a terminal receives a signal from a network side (via/using TRP1/2) (or may be an operation), and an operation in which a terminal transmits a signal to TRP1/TRP2 may be interpreted/described as an operation in which a terminal transmits a signal to the network side (via/using TRP1/TRP2) (or may be an operation), and vice versa can also be interpreted/described.

Specifically, FIG. 18 shows signaling when a UE receives (i.e., when each TRP sends DCI to a UE) multiple DCIs (i.e., repeated transmission of DCI (refer to embodiment 1) or divided transmission of DCI (refer to embodiment 2)) in an M-TRP (or cell, all TRPs below can be replaced with cells, or M-TRP can be assumed even when multiple CORESETs are configured from one TRP) situation.

A UE may transmit its own capability information to a network (S1801).

Here, the UE may report the maximum number of CORESETs that the UE can be configured in one BWP and one serving cell as a capability to the network.

In particular, as in embodiment 5 above, the network can configure one or more CORESETs to the UE within the maximum number of CORESETs reported by the UE by differently counting the number of CORESETs based on the number of TCI states configured in CORESET.

Here, the UE may report the maximum number (y) of COREST in which two TCI states are configured and the maximum number (x) of COREST in which one TCI state is configured as a capability separately to the network. And/or the UE may report the maximum value z of the sum of the number of CORESTs in which two TCI states are configured and the number of CORESTs in which one TCI state is configured as a capability to the network.

The operation that a UE (100/200 in FIG. 20) transmits capability information of the UE to a network (200/100 in FIG. 20) of the step S1801 described above may be implemented by an apparatus of FIG. 20 to be described below. For example, referring to FIG. 20, one or more processors 102/202 may control one or more transceivers 106 and/or one or more memories 104 to transmit capability information of a UE, and one or more transceivers 106 may transmit capability information of a UE to a network.

A UE may receive configuration information for multiple TRP-based transmission/reception through/using TRP 1 (and/or TRP 2) from a network side (S1802).

Here, the configuration information may include information related to the configuration of the network side (i.e., TRP configuration), resource information (resource allocation) related to multiple TRP-based transmission/reception, etc. Here, the configuration information may be transmitted to a UE through higher layer signaling (e.g., RRC signaling, MAC-CE, etc.). In addition, when the configuration information is predefined or predetermined, step S18002 may be omitted.

For example, the configuration information may include information on the number of repeated PDCCH transmissions, time interval (P), etc., information on DCI format/SS/RNTI type to which repeated PDCCH transmission can be applied, configuration of PDCCH transmission occasion, confirmation related to a window, configuration related to a mapping method/scheme between PDCCH TOs and setting, configuration related to a mapping method/scheme between PDCCH TOs and CORESETs, etc., described in the above method (embodiment 1 (embodiment 1-1/1-2/1-3/1-4), embodiment 2 (embodiment 2-1/2-2/2-3/2-4), embodiment 3, embodiment 4, embodiment 5, etc.).

In addition, for example, the configuration information may include CORESET-related configuration information (e.g., ControlResourceSet IE) and/or search space configuration information (e.g., SearchSpace IE) described in the above method (embodiment 1 (embodiment 1-1/1-2/1-3/1-4), embodiment 2 (embodiment 2-1/2-2/2-3/2-4), embodiment 3, embodiment 4, embodiment 5, etc.). The CORESET-related configuration information may include a CORESET-related ID (e.g., controlResourceSetID), an index of the CORESET pool for the CORESET (e.g., CORESETPoolIndex), time/frequency resource configuration of the CORESET, TCI information related to the CORESET, etc.

In addition, as described above in embodiment 1-3, the configuration information may include information to inform that a specific search space set(s) and/or specific CORESET(s) is used to repeatedly transmit the same DCI (or PDCCH) (that is, it is configured for repeated transmission). For example, this information may be information indicating that specific search spaces are the same group, and/or information indicating that specific CORESETs are the same group.

Similarly, as described above in embodiment 2-3, the configuration information may include information to inform that a specific search space set(s) and/or specific CORESET(s) is used to dividedly transmit the same DCI (or PDCCH) (that is, it is configured for divided transmission). For example, this information may be information indicating that specific search spaces are the same group, and/or information indicating that specific CORESETs are the same group.

In addition, as described in embodiment 3 above, according to configuration information of CORESET and/or configuration information of SS (that is, based on the satisfaction of a specific condition), a MTRP PDCCH transmission scheme of steps S1803 and S1804 to be described below may be determined.

For example, the operation that a UE (100/200 in FIG. 20) receives the configuration information related to the multiple TRP-based transmission and reception from a network side (200/100 in FIG. 20) of the step S1802 described above may be implemented by an apparatus of FIG. 20 to be described below. For example, referring to FIG. 20, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from a network side.

A UE may receive DCI 1 through/using TRP 1 from a network (S1803). In addition, the UE may receive DCI 2 through/using TRP 2 from the network (S1804).

Here, step S1803 and step S1804 may be performed simultaneously, or one may be performed earlier than the other.

Here, DCI 1 and DCI 2 may be the same DCI as in embodiment 1 above, and DCI 1 may be transmitted through PDCCH candidate 1, and DCI 2 may be transmitted through PDCCH candidate 2. In addition, PDCCH candidate 1 and PDCCH candidate 2 may be transmitted based on different TCI states, respectively. In this case, as in embodiment 1-1, PDCCH candidate 1 and PDCCH candidate 2 may share one (same) CORESET, but may be defined/configured in different SS sets. Alternatively, as in embodiment 1-2, PDCCH candidate 1 and PDCCH candidate 2 may be defined/configured in one (same) CORESET and one (same) SS set. Alternatively, as in embodiment 1-3, PDCCH candidate 1 and PDCCH candidate 2 may be defined/configured in different CORESETs and may be defined/configured in different SS sets. Alternatively, as in embodiment 1-4, PDCCH candidate 1 and PDCCH candidate 2 are defined/configured in different CORESETs, but may be defined/configured in one (same) SS set. In this case, DCI 1 and DCI 2 may be transmitted/received based on the TCI state mapping method described in the above method (embodiment 1 (embodiment 1-1/1-2/1-3/1-4), embodiment 2 (embodiment 2-1/2-2/2-3/2-4), embodiment 3, embodiment 4, embodiment 5, etc.). For example, a mapping between TO and TCI state of a control channel may be configured based on configuration of CORESET/SS set, etc. in a window in which DCI is received. For more detailed operation, reference may be made to the description of the embodiment above.

Alternatively, DCI 1 and DCI 2 may be DCI parts in which one DCI is divided as in embodiment 2 above. In addition, DCI 1 may be transmitted through PDCCH candidate 1, DCI 2 may be transmitted through PDCCH candidate 2, and PDCCH candidate 1 and PDCCH candidate 2 may be aggregated to form a single PDCCH candidate in which one DCI is transmitted. In addition, PDCCH candidate 1 and PDCCH candidate 2 may be transmitted based on different TCI states, respectively. In this case, as in embodiment 2-1 above, one PDCCH candidate dividedly transmitted from a plurality of TRPs may be defined/configured in one (same) CORESET, but may be defined/configured in different SS sets. Alternatively, as in embodiment 2-2 above, one PDCCH candidate dividedly transmitted from a plurality of TRPs may be defined/configured in one (same) CORESET and one (same) SS set. Alternatively, as in embodiment 2-3 above, one PDCCH candidate dividedly transmitted from a plurality of TRPs may be defined/configured in a plurality of CORESETs and may be defined/configured in a plurality of SS sets. Alternatively, as in embodiment 2-4 above, one PDCCH candidate dividedly transmitted from a plurality of TRPs is defined/configured in a plurality of CORESETs, but may be defined/configured in one SS set. For more detailed operation, reference may be made to the description of the embodiment above.

In addition, for example, as in the above-described embodiment 3, the above-described MTRP PDCCH transmission method may be determined based on configuration of CORESET and SS configured to a UE. For example, the MTRP PDCCH transmission method (scheme) may be configured based on a combination of the configured number of CORESETs and the number of SSs and/or configuration of parameters related to each CORESET/SS.

In addition, for example, the DCI 1 and the DCI 2 may include (indication) information for a TCI state, resource allocation information for DMRS and/or data (i.e., spatial/frequency/time resources), etc., described in the above method (embodiment 1 (embodiment 1-1/1-2/1-3/1-4), embodiment 2 (embodiment 2-1/2-2/2-3/2-4), embodiment 3, embodiment 4, embodiment 5, etc.). For example, the DCI 1 and the DCI 2 may include information related to repeated transmission of a control channel (e.g., PDCCH) (e.g., a specific DCI format/SS/RNTI, etc.), indication information related to transmission occasion (TO) configuration, and information related to a mapping between TOs and TCI states (e.g., mapping order), etc.

For example, the operation that a UE (100/200 in FIG. 20) receives the DCI 1 and/or the DCI 2 from a network side (200/100 in FIG. 20) of the steps S1803 and S1804 described above may be implemented by an apparatus of FIG. 20 to be described below. For example, referring to FIG. 20, one or more processors 102 may control one or more transceivers 106 and/or one or more memories 104 to receive the DCI 1 and/or the DCI 2, and one or more transceivers 106 may receive the DCI 1 and/or the DCI 2 from a network.

A UE may receive data 1 scheduled by DCI 1 and DCI 2 through/using TRP 1 from a network, or transmit data 1 scheduled by DCI 1 and DCI 2 to a network through/using TRP 1 (S1805). And/or a UE may receive data 2 scheduled by DCI 1 and DCI 2 from a network via/using TRP 2, or transmit data 2 scheduled by DCI 1 and DCI 2 to a network via/using TRP 2 (S1806).

For example, the operation that a UE (100/200 in FIG. 20) receives data 1 and/or data 2 from a network (200/100 in FIG. 20), or transmits data 1 and/or data 2 to a network (200/100 in FIG. 20) of the steps S1805 and S1806 described above may be implemented by an apparatus of FIG. 20 to be described below. For example, referring to FIG. 20, one or more processors 102 may control one or more transceivers 106 and/or one or more memories 104 to transmit/receive data 1 and/or data 2, and one or more transceivers 106 may transmit/receive data 1 and/or data 2 to/from a network.

In addition, a UE may decode data 1 and/or data 2 received via/using TRP 1 (and/or TRP 2) from the network. For example, a UE may perform channel estimation and/or decoding of data based on the method described above (embodiment 1 (embodiment 1-1/1-2/1-3/1-4), embodiment 2 (embodiment 2-1/2-2/2-3/2-4), embodiment 3, embodiment 4, embodiment 5, etc.). For example, channel estimation and/or decoding of data may be performed by applying an aggregation level/a TCI state mapping, etc. according to a definition of a candidate of a control channel (PDCCH) (e.g., defined based on CORESET/SS set). The operation of the UE (100/200 of FIG. 20) decoding data 1 and/or data 2 may be implemented by an apparatus of FIG. 20 to be described below. For example, referring to FIG. 20, one or more processors 102 may control one or more memories 104, etc. to perform an operation of decoding data 1 and/or data 2.

In addition, HARQ-ACK information (e.g., ACK information, NACK information, etc.) for data 1 and/or data 2 may be transmitted to a network through/using TRP 1 and/or TRP 2. In this case, HARQ-ACK information for data 1 and/or data 2 may be aggregated into one. In addition, a UE may be configured to transmit only HARQ-ACK information to a representative TRP (e.g., TRP 1), and transmission of HARQ-ACK information to another TRP (e.g., TRP 2) may be omitted.

For example, the operation that a UE (100/200 in FIG. 20) transmits HARQ-ACK information for data 1 and/or data 2 to a network (200/100 in FIG. 20) may be implemented by an apparatus of FIG. 20 to be described below. For example, referring to FIG. 20, one or more processors 102 may control one or more transceivers 106 and/or one or more memories 104 to transmit HARQ-ACK information for data 1 and/or data 2, and one or more transceivers 106 may transmit HARQ-ACK information for data 1 and/or data 2 to a network.

Figure 19:
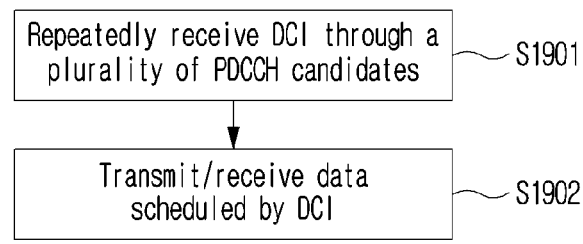
FIG. 19 illustrates a method for a terminal to receive downlink control information according to an embodiment of the present disclosure.

FIG. 19 illustrates a method for a terminal to receive downlink control information according to an embodiment of the present disclosure.

The procedure illustrated in FIG. 19 may be implemented by the apparatus 100/200 illustrated in FIG. 20 to be described below.

Referring to FIG. 19, a UE repeatedly receives DCI through a plurality of PDCCH candidates (S1901).

Here, a UE may repeatedly receive DCI from a plurality of TRPs (or base stations/cells/panels) through a plurality of PDCCH candidates, and PDCCH candidates transmitted from different TRPs may be mapped to different TCI states.

Here, the same DCI may be transmitted through PDCCH candidate 1 and PDCCH candidate 2. In addition, as described above, PDCCH candidate 1 and PDCCH candidate 2 may be transmitted based on different TCI states, respectively. In this case, as in embodiment 1-1, PDCCH candidate 1 and PDCCH candidate 2 may share one (same) CORESET, but may be defined/configured in different SS sets. Alternatively, as in embodiment 1-2, PDCCH candidate 1 and PDCCH candidate 2 may be defined/configured in one (same) CORESET and one (same) SS set. Alternatively, as in embodiment 1-3, PDCCH candidate 1 and PDCCH candidate 2 may be defined/configured in different CORESETs and may be defined/configured in different SS sets. Alternatively, as in embodiment 1-4, PDCCH candidate 1 and PDCCH candidate 2 are defined/configured in different CORESETs, but may be defined/configured in one (same) SS set. For more detailed operation, reference may be made to the above description.

To describe an example of embodiment 1-1 in more detail, in step S1901, DCI may be transmitted through a first PDCCH candidate in a first search space set and a second PDCCH candidate in a second search space set. In addition, the first search space set and the second search space set may be associated with different TCI states. That is, the first PDCCH candidate and the second PDCCH candidate may be associated with different TCI states.

In addition, in a time domain, a window that is a period in which the first PDCCH candidate and the second PDCCH candidate are transmitted may be preconfigured (it may be configured by a base station or may be agreed in advance between a base station and a terminal).

In addition, the repetition number for transmission of DCI may be preconfigured or determined based on the number of TCI states configured for repeated transmission of DCI.

In addition, a window may be started for every PDCCH transmission occasion of a specific search space set (e.g., a search space set having the lowest identifier) among the first search space set and the second search space set. If a plurality of PDCCH transmission occasions of a specific search space set are included in a window, a window may be started for every PDCCH transmission occasion of a specific search space set after the window.

In addition, N windows (N is a natural number) may be configured for each period of a specific search space set among the first search space set and the second search space set.

The TCI state may be sequentially and circularly mapped to each PDCCH transmission occasion of the first search space set and the second search space set within the window configured as above. Alternatively, the TCI state may be sequentially and circularly mapped to each of consecutive PDCCH transmission occasions (i.e., a group of PDCCH transmission occasions) of the first search space set and the second search space within the window.

In addition, the first search space set and the second search space set may be associated with a single CORESET. In addition, a plurality of TCI states may be configured for a single CORESET, and the first search space set and the second search space set may be related to different TCI states among the plurality of TCI states. Here, a single CORESET may be a CORESET (e.g., CORESET 0) used to transmit system information.

In addition, the first search space set and the second search space set may be associated with different CORESETs. In addition, in different CORESETs, parameters other than a TCI state and a CORESET identifier may be identically configured.

In addition, although not illustrated in FIG. 19, a step of receiving configuration information for multiple TRP-based transmission and reception from a base station may be performed before step S1901.

Here, the configuration information may include information related to the configuration of the network side (i.e., TRP configuration), resource information (resource allocation) related to multiple TRP-based transmission/reception, etc. Here, the configuration information may be transmitted to a UE through higher layer signaling (e.g., RRC signaling, MAC-CE, etc.). In addition, when the configuration information is predefined or predetermined, step S18002 may be omitted.

For example, the configuration information may include information on the number of repeated PDCCH transmissions, time interval (P), etc., information on DCI format/SS/RNTI type to which repeated PDCCH transmission can be applied, configuration of PDCCH transmission occasion, confirmation related to a window, configuration related to a mapping method/scheme between PDCCH TOs and setting, configuration related to a mapping method/scheme between PDCCH TOs and CORESETs, etc., described in the above method (embodiment 1 (embodiment 1-1/1-2/1-3/1-4), embodiment 2 (embodiment 2-1/2-2/2-3/2-4), embodiment 3, embodiment 4, embodiment 5, etc.).

In addition, for example, the configuration information may include CORESET-related configuration information (e.g., ControlResourceSet IE) and/or search space configuration information (e.g., SearchSpace IE) described in the above method (embodiment 1 (embodiment 1-1/1-2/1-3/1-4), embodiment 2 (embodiment 2-1/2-2/2-3/2-4), embodiment 3, embodiment 4, embodiment 5, etc.). The CORESET-related configuration information may include a CORESET-related ID (e.g., controlResourceSetID), an index of the CORESET pool for the CORESET (e.g., CORESETPoolIndex), time/frequency resource configuration of the CORESET, TCI information related to the CORESET, etc.

In addition, as described above in embodiment 1-3, the configuration information may include information to inform that a specific search space set(s) and/or specific CORESET(s) is used to repeatedly transmit the same DCI (or PDCCH) (that is, it is configured for repeated transmission). For example, this information may be information indicating that specific search spaces are the same group, and/or information indicating that specific CORESETs are the same group.

Similarly, as described above in embodiment 2-3, the configuration information may include information to inform that a specific search space set(s) and/or specific CORESET(s) is used to dividedly transmit the same DCI (or PDCCH) (that is, it is configured for divided transmission). For example, this information may be information indicating that specific search spaces are the same group, and/or information indicating that specific CORESETs are the same group.

In addition, although not illustrated in FIG. 19, a step of reporting to a capability of a terminal including the maximum number of CORESETs configurable to a terminal to a base station may be performed before step S1901. In this case, by counting the number of CORESETs differently based on the number of TCI states configured in a CORESET, one or more CORESETs may be configured to a terminal within the maximum number.

In addition, although not illustrated in FIG. 19, a step of a terminal receiving configuration information related to repeated DCI transmission (repeat PDCCH transmission) may be performed before the step S1901.

Alternatively, DCI 1 of the step S1901 may be DCI parts in which one DCI is divided as in embodiment 2 above. In addition, a part of DCI may be transmitted through PDCCH candidate 1, the remaining of DCI may be transmitted through PDCCH candidate 2, and PDCCH candidate 1 and PDCCH candidate 2 may be aggregated to form a single PDCCH candidate in which one DCI is transmitted. In addition, PDCCH candidate 1 and PDCCH candidate 2 may be transmitted based on different TCI states, respectively. Alternatively, as in embodiment 2-1 above, one PDCCH candidate dividedly transmitted from a plurality of TRPs may be defined/configured in one (same) CORESET, but may be defined/configured in different SS sets. Alternatively, as in embodiment 2-2 above, one PDCCH candidate dividedly transmitted from a plurality of TRPs may be defined/configured in one (same) CORESET and one (same) SS set. Alternatively, as in embodiment 2-3 above, one PDCCH candidate dividedly transmitted from a plurality of TRPs may be defined/configured in a plurality of CORESETs and may be defined/configured in a plurality of SS sets. Alternatively, as in embodiment 2-4 above, one PDCCH candidate dividedly transmitted from a plurality of TRPs is defined/configured in a plurality of CORESETs, but may be defined/configured in one SS set. For more detailed operation, reference may be made to the description of the embodiment above.

In addition, for example, as in the above-described embodiment 3, the above-described MTRP PDCCH transmission method may be determined based on configuration of CORESET and SS configured to a UE. For example, the MTRP PDCCH transmission method (scheme) may be configured based on a combination of the configured number of CORESETs and the number of SSs and/or configuration of parameters related to each CORESET/SS.

A terminal transmits/receives uplink/downlink data scheduled by DCI to/from a base station (S1902).

General Device to which the Present Disclosure May be Applied

Figure 20:
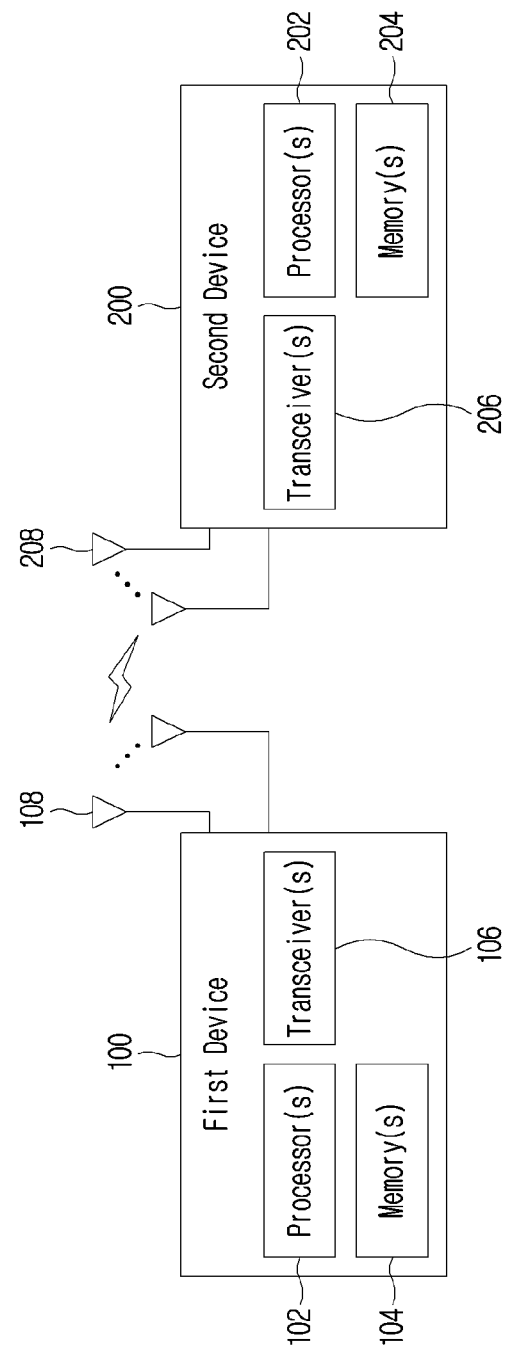
FIG. 20 is a diagram which illustrates a block diagram of a wireless communication system according to an embodiment of the present disclosure.

FIG. 20 is a diagram which illustrates a block diagram of a wireless communication device according to an embodiment of the present disclosure.

In reference to FIG. 20, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of receiving downlink control information (DCI) in a wireless communication system, the method performed by a terminal comprising:
repeatedly receiving the DCI through a plurality of physical downlink control channel (PDCCH) candidates; and
transmitting and receiving data scheduled by the DCI;
wherein the DCI is transmitted through a first physical downlink control channel (PDCCH) candidate in a first search space set and a second PDCCH candidate in a second search space set,
wherein the first search space set and the second search space set are related to different transmission configuration indication (TCI) states,
wherein a window that is a duration in which the first PDCCH candidate and the second PDCCH candidate are transmitted in a time domain is predetermined.

2. The method of claim 1,
wherein a number of repeated transmission of the DCI is preconfigured or determined based on a number of TCI states configured for repeated transmission of the DCI.

3. The method of claim 1,
wherein the window starts at every PDCCH transmission occasion of a specific search space set among the first search space set and the second search space set.

4. The method of claim 3,
wherein when a plurality of PDCCH transmission occasions of the specific search space set are included in the window, the window starts at every PDCCH transmission occasion of the specific search space set after the window.

5. The method of claim 3,
wherein the specific search space is a search space set having the lowest identifier among the first search space set and the second search space set.

6. The method of claim 1,
wherein N windows (N is a natural number) are configured for each period of a specific search space set among the first search space set and the second search space set.

7. The method of claim 1,
wherein the TCI states are sequentially and circularly mapped to each PDCCH transmission occasion of the first search space set and the second search space set within the window.

8. The method of claim 1,
wherein the TCI states are sequentially and circularly mapped to each of contiguous PDCCH transmission occasions of the first search space set and the second search space set within the window.

9. The method of claim 1, further comprising:
receiving configuration information from a base station,
wherein the configuration information includes information for informing that the first search space set and the second search space set are used for repeated transmission through the plurality of PDCCH candidates of the DCI.

10. The method of claim 1,
wherein the first search space set and the second search space set are related to a single control resource set (CORESET),
wherein a plurality of TCI states are configured in the single CORESET, and the first search space set and the second search space set are related to different TCI states among the plurality of TCI states.

11. The method of claim 10,
wherein the single CORESET is a CORESET used to transmit system information.

12. The method of claim 1,
wherein the first search space set and the second search space set are related to a first control resource set (CORESET) and a second CORESET, respectively.

13. The method of claim 12,
wherein parameters other than a TCI state and a CORESET identifier are configured to be identical in the first CORESET and the second CORESET.

14. The method of claim 12, further comprising:
receiving configuration information from a base station,
wherein the configuration information includes information for informing that the first search space set and the second search space set are used for repeated transmission through the plurality of PDCCH candidates of the DCI.

15. The method of claim 1, further comprising:
reporting, by the terminal, a capability including a maximum number of control resource sets (CORESET) configurable to the terminal to the base station,
wherein by counting a number of CORESETs differently based on a number of TCI states configured in CORESET, one or more CORESETs are configured in the terminal within the maximum number.

16. A terminal for receiving downlink control information (DCI) in a wireless communication system, the terminal comprising:
- at least one transceiver for transmitting and receiving a radio signal; and
- at least one processor for controlling the at least one transceiver,
- wherein the at least one processor is configured to:
- repeatedly receive the DCI through a plurality of physical downlink control channel (PDCCH) candidates; and
- transmit and receive data scheduled by the DCI,
- wherein the DCI is transmitted through a first physical downlink control channel (PDCCH) candidate in a first search space set and a second PDCCH candidate in a second search space set,
- wherein the first search space set and the second search space set are related to different transmission configuration indication (TCI) states,
- wherein a window that is a duration in which the first PDCCH candidate and the second PDCCH candidate are transmitted in a time domain is predetermined.

17. At least one non-transitory computer-readable medium storing at least one instruction,
- wherein the at least one instruction executable by at least one processor controls a device for receiving downlink control information (DCI) in a wireless communication system to:
- repeatedly receive the DCI through a plurality of physical downlink control channel (PDCCH) candidates; and
- transmit and receive data scheduled by the DCI;
- wherein the DCI is transmitted through a first physical downlink control channel (PDCCH) candidate in a first search space set and a second PDCCH candidate in a second search space set,
- wherein the first search space set and the second search space set are related to different transmission configuration indication (TCI) states,
- wherein a window that is a duration in which the first PDCCH candidate and the second PDCCH candidate are transmitted in a time domain is predetermined.

\* \* \* \* \*